US010162162B2

(12) United States Patent
Wang et al.

(10) Patent No.: US 10,162,162 B2
(45) Date of Patent: Dec. 25, 2018

(54) MICROFLUIDIC SYSTEMS AND METHODS FOR HYDRODYNAMIC MICROVORTICAL CELL ROTATION IN LIVE-CELL COMPUTED TOMOGRAPHY

(71) Applicant: Arizona Board of Regents, a body corporate of the State of Arizona, acting for and on behalf of Arizona State University, Scottsdale, AZ (US)

(72) Inventors: Hong Wang, Tempe, AZ (US); Deirdre Meldrum, Phoenix, AZ (US); Rishabh Shetty, Tempe, AZ (US); Laimonas Kelbauskas, Gilbert, AZ (US); Shih-Hui Chao, Phoenix, AZ (US); Roger Johnson, Phoenix, AZ (US); Jakrey Myers, Scottsdale, AZ (US); Samantha Chan, Tempe, AZ (US)

(73) Assignee: ARIZONA BOARD OF REGENTS, A BODY CORPORATE OF THE STATE OF ARIZONA, ACTING FOR AND ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 17 days.

(21) Appl. No.: 14/861,143

(22) Filed: Sep. 22, 2015

(65) Prior Publication Data
US 2016/0084750 A1    Mar. 24, 2016

Related U.S. Application Data

(60) Provisional application No. 62/054,839, filed on Sep. 24, 2014.

(51) Int. Cl.
*C12M 1/34* (2006.01)
*G02B 21/36* (2006.01)
(Continued)

(52) U.S. Cl.
CPC ........ *G02B 21/36* (2013.01); *B01L 3/502707* (2013.01); *B01L 3/502715* (2013.01);
(Continued)

(58) Field of Classification Search
CPC ... C12M 23/16; B01L 3/502707; B01L 3/715; B01L 2200/0668; B01L 2200/10;
(Continued)

(56) References Cited

U.S. PATENT DOCUMENTS 6,519,355 B2    2/2003    Nelson
6,522,775 B2    2/2003    Nelson
(Continued)

OTHER PUBLICATIONS

Avery, Simon V., "Microbial cell individuality and the underlying sources of heterogeneity," Nature Reviews Microbiology, vol. 4, Aug. 2006, pp. 577-587.
(Continued)

*Primary Examiner* — William H. Beisner
(74) *Attorney, Agent, or Firm* — Withrow & Terranova, P.L.L.C.; Vincent K. Gustafson

(57) ABSTRACT

Microfluidic devices for 3D hydrodynamic microvortical rotation of at least one live single cell or cell cluster, systems incorporating the devices, and methods of fabricating and using the devices and systems, are provided. A microfluidic chip rotates at least one live single cell or cell cluster in a microvortex about a stable rotation axis perpendicular to an optical axis within a chamber having a trapezoidal cross-sectional shape located below a flow channel. An optical trap may be used to position the cell or cells with the microvortex, and the cell or cells may be subject to live-cell or cell cluster computer tomography imaging.

17 Claims, 26 Drawing Sheets

(51) Int. Cl.
    B01L 3/00      (2006.01)
    G02B 21/00     (2006.01)
    G02B 21/32     (2006.01)
    G02B 21/33     (2006.01)
(52) U.S. Cl.
    CPC ......... *G02B 21/0004* (2013.01); *G02B 21/32* (2013.01); *G02B 21/33* (2013.01); *B01L 2200/0668* (2013.01); *B01L 2200/10* (2013.01); *B01L 2200/12* (2013.01); *B01L 2300/0654* (2013.01); *B01L 2300/0858* (2013.01); *B01L 2400/0454* (2013.01); *B01L 2400/0487* (2013.01)
(58) Field of Classification Search
    CPC ..... B01L 2300/0851; B01L 2300/0858; B01L 2400/0454; B01L 2400/0487
    See application file for complete search history.

(56)   References Cited

U.S. PATENT DOCUMENTS 6,636,623 B2    10/2003   Nelson et al.
   6,991,738 B1     1/2006   Fauver et al.
   7,197,355 B2     3/2007   Nelson
   2006/0279025 A1 12/2006   Heidari et al.

OTHER PUBLICATIONS

Baek, Sunghoon et al., "A one-step photolithography method for fabrication of a staggered herringbone mixer using inclined UV lithography," Journal of Micromechanics and Microengineering, vol. 21, No. 7, Jul. 2011, pp. 17001-77005.
Beck, Caroline et al., "Microfluidics in Single Cell Analysis," Advances in Microfluidics, InTech, Mar. 2012, pp. 173-192.
Berthold, A. et al., "Two-step Glass Wet-etching for Micro-fluidic Devices," Proceedings of the SeSens workshop, 2000, pp. 613-616.
Beuret, C. et al., "Microfabrication of 3D Multidirectional Inclined Structures by UV Lithography and Electroplating," Proceedings of the IEEE Workshop on Micro Electro Mechanical Systems, 1994, IEEE, pp. 81-85.
Chang, Sung-Il et al., "Shape-controlled, high fill-factor microlens arrays fabricated by a 3D diffuser lithography and plastic replication method," Optics Express, vol. 12, No. 25, Dec. 13, 2004, OSA, pp. 6366-6371.
Chiu, Daniel T., "Cellular manipulations in microvortices," Analytical and Bioanalytical Chemistry, vol. 387, No. 1, 2007, pp. 17-20.
Cohen, A. A. et al., "Dynamic Proteomics of Individual Cancer Cells in Response to a Drug," Science, vol. 322, Dec. 5, 2008, pp. 1511-1516.
De Souza, Natalie, "Single-cell methods," Nature Methods, vol. 9, No. 1, Jan. 2012, p. 35.
Fauver, Mark et al., "Three-dimensional imaging of single isolated cell nuclei using optical projection tomography," Optics Express, vol. 13, No. 11, May 30, 2005, 14 pages.
Ikuta, Koji et al., "New Micro Stereo Lithography for Freely Movable 3D Micro Structure," Proceedings of the IEEE International Conference on Micro Electro Mechanical Systems (MEMS), Feb. 1998, pp. 290-295.
Jang, Ling-Sheng et al., "Microfluidic circulatory flows induced by resonant vibration of diaphragms," Sensors and Actuators A, vol. 122, 2005, pp. 141-148.
Lee, Joo-Hyung et al., "A simple and effective fabrication method for various 3D microstructures: backside 3D diffuser lithography," Journal of Micromechanics and Microengineering, vol. 18, No. 12, Nov. 6, 2008, 8 pages.
Lee, Seok Jae et al., "Multidirectional Tilted UV Lithography: A Key Fabrication Method of Polymeric Microflidic Device," 17th International Conference on Miniaturized Systems for Chemistry and Life Sciences, Oct. 27-31, 2013, Freiburg, Germany, pp. 1424-1426.
Lim, David S. W. et al., "Dynamic formation of ring-shaped patterns of colloidal particles in microfluidic systems," Applied Physics Letters, vol. 83, No. 6, Aug. 11, 2003, AIP, pp. 1145-1147.
Lutz, Barry R. et al., "Hydrodynamic tweezers: single-cell trapping arrays for cell dynamics," 9th International conference on Miniaturized Systems for Chemistry and Life Sciences (µTAS), Boston, Massachusetts, Oct. 9-13, 2005, pp. 512-514.
Lutz, Barry R. et al., "Trapping and chemical dosing of suspended cells in hydrodynamic tweezer arrays," 10th International Conference on Miniaturized Systems for Chemistry and Life Sciences (µTAS), Tokyo, Japan, Nov. 5-9, 2006, pp. 1516-1518.
Myers, Jakrey R., "A Chip for Hydrodynamic Microvortical Rotation of Live Single Cells," Masters Thesis, 2012, 104 pages.
Neuman, Keir C. et al., "Optical trapping," Review of Scientific Instruments, vol. 75, No. 9, Sep. 2004, AIP, pp. 2787-2809.
O'Shea, Donald C. et al., "Gray-scale masks for diffractive-optics fabrication: II. Spatially filtered halftone screens," Applied Optics, vol. 34, No. 32, Nov. 10, 1995, pp. 7518-7526.
Shelby, J. Patrick et al., "Controlled rotation of biological micro- and nano-particles in microvortices," Lab Chip, vol. 4, No. 3, Jun. 2004, pp. 168-170.
Shelby, J. Patrick et al., "Direct Manipulation and Observation of the Rotational Motion of Single Optically Trapped Microparticles and Biological Cells in Microvorticies," Analytical Chemistry, vol. 76, No. 9, May 1, 2004, pp. 2492-2497.
Shen, C. et al., "Low Reynolds number flow over cavities," Physics of Fluids, vol. 28, Nov. 1985, pp. 3191-3202.
Shetty, Rishabh M., "Optimization and Parametric Characterization of a Hydrodynamic Microvortex Chip for Single Cell Rotation," Masters Thesis, 2013, 78 pages.
Squires, Todd M. et al., "Microfluidics: Fluid physics at the nanoliter scale," Reviews of Modern Physics, vol. 77, Jul. 2005, 50 pages.
Suleski, Thomas J. et al., "Gray-scale masks for diffractive-optics fabrication: I. Commercial slide imagers," Applied Optics, vol. 34, No. 32, Nov. 10, 1995, pp. 7507-7517.
Waits, C. M. et al., "Microfabrication of 3D silicon MEMS structures using gray-scale lithography and deep reactive on etching," Sensors and Actuators A, vol. 119, No. 1, 2005, pp. 245-253.
Moon, Jun-Bo et al., "Novel and high-yield fabrication of electroplated 3D micro-coils for MEMS and microelectronics," SPIE, vol. 3511, Sep. 1998, pp. 233-240.
Yoon, Yong-Kyu et al., "Multidirectional UV Lithography for Complex 3-D MEMS Structures," Journal of Microelectromechanical Systems, vol. 15, No. 5, Oct. 2006, IEEE, pp. 1121-1130.
Yun, Hoyoung et al., "Cell manipulation in microfluidics," Biofabrication, vol. 5, Feb. 2013, 14 pages.
Zeng, Jia et al., "Quantitative single-cell gene expression measurements of multiple genes in response to hypoxia treatment," Analytical and Bioanalytical Chemistry, vol. 401, No. 1, Jul. 2011, 11 pages.
Zhang, Wenjie et al., "Simulation and Experimental Characterization of Microscopically Accessible Hydrodynamic Microvortices," Micromachines, vol. 3, 2012, MDPI, pp. 529-541.
Zhang, Wenjie, "Optimizing Micro-vortex Chamber for Living Single Cell Rotation," Masters Thesis, 2011, 71 pages.

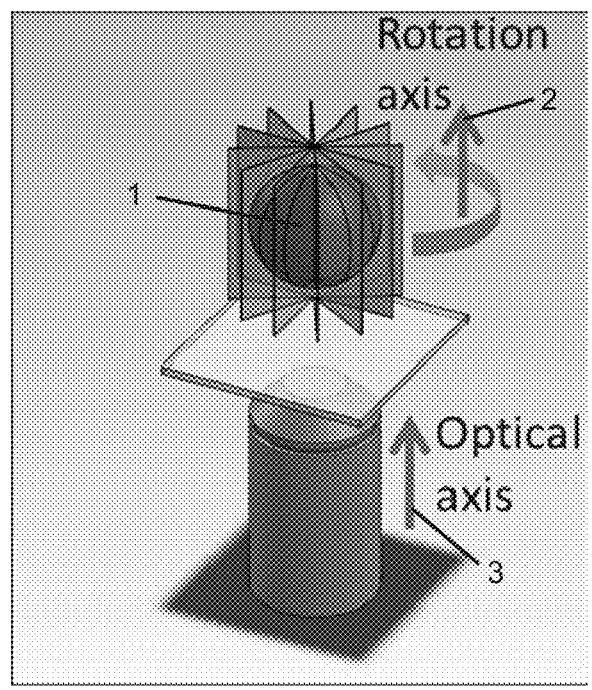
FIG._1A
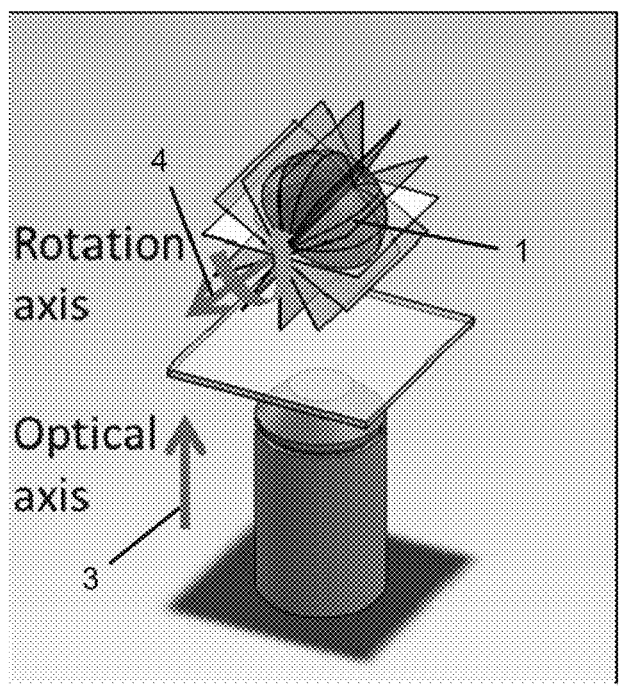
FIG._1B

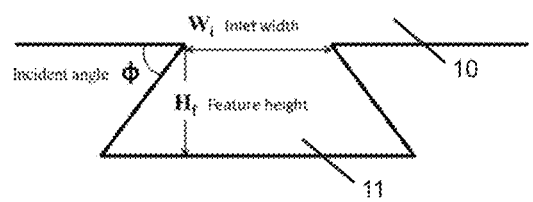
FIG._2
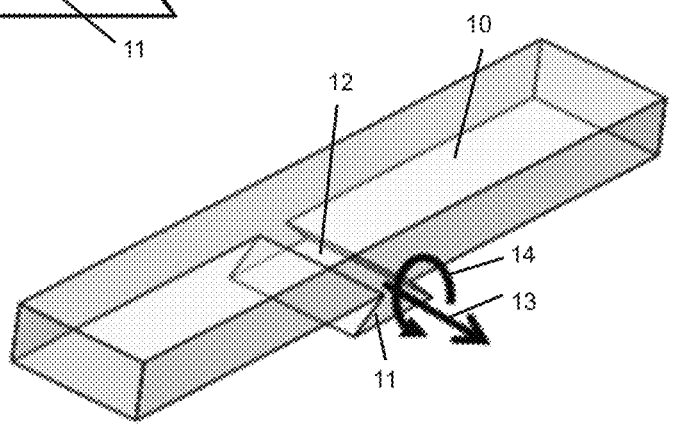
FIG._3
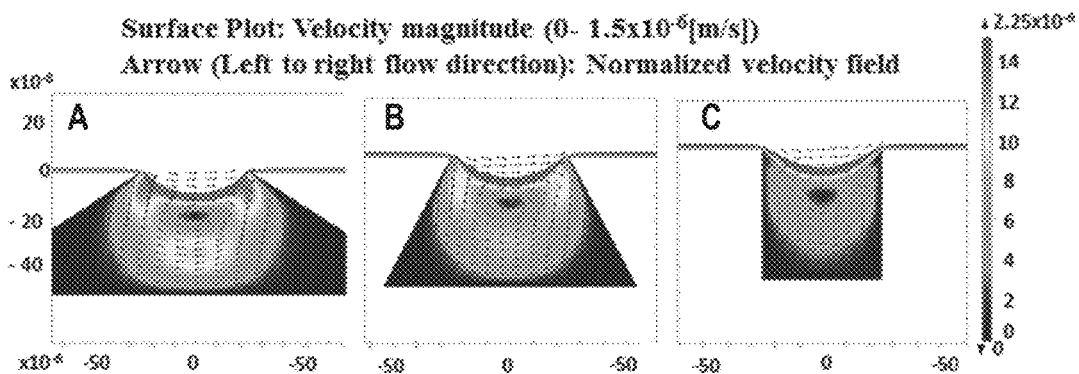
FIG._4

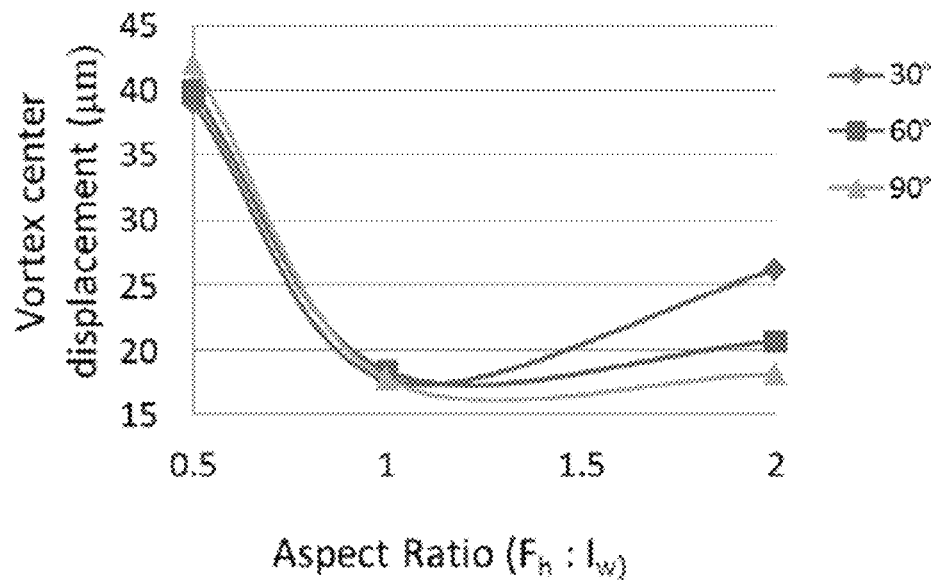
FIG._5
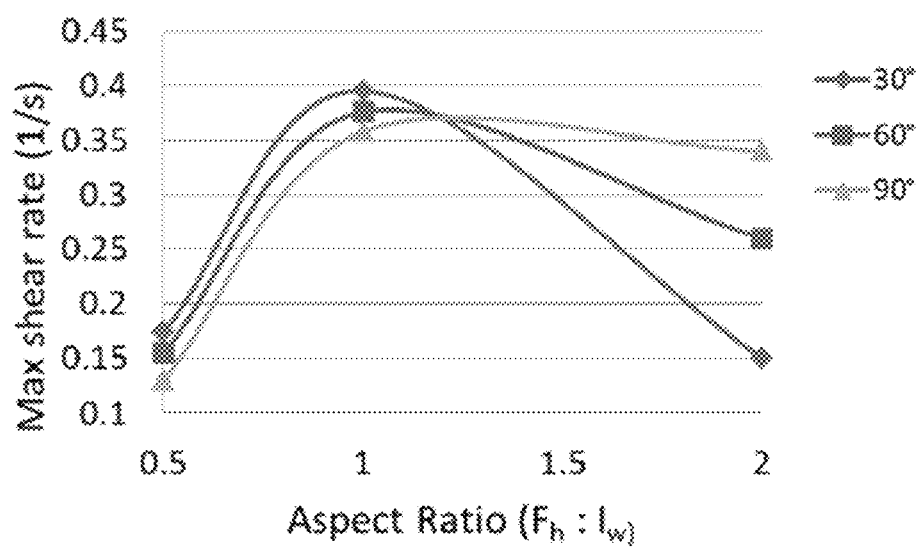
FIG._6

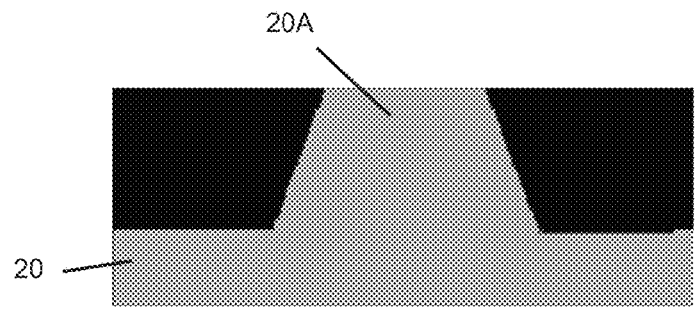
FIG._7B
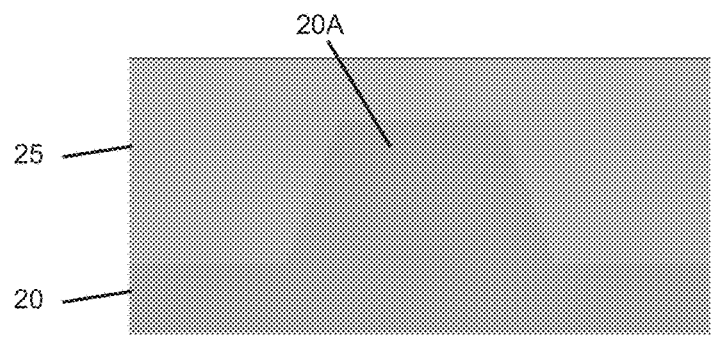
FIG._7C
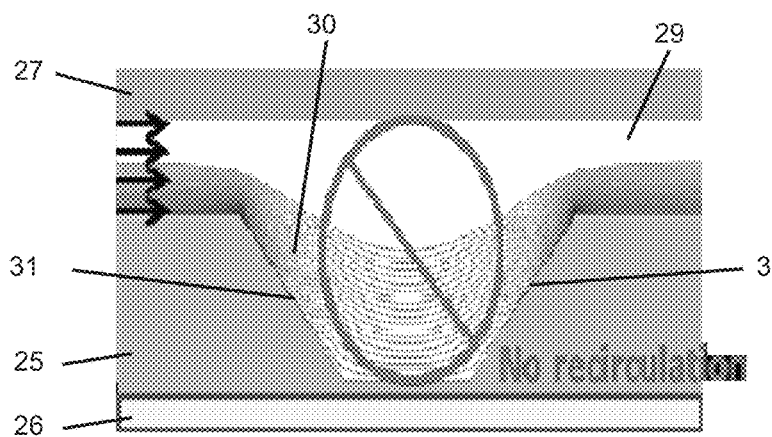
FIG._7D

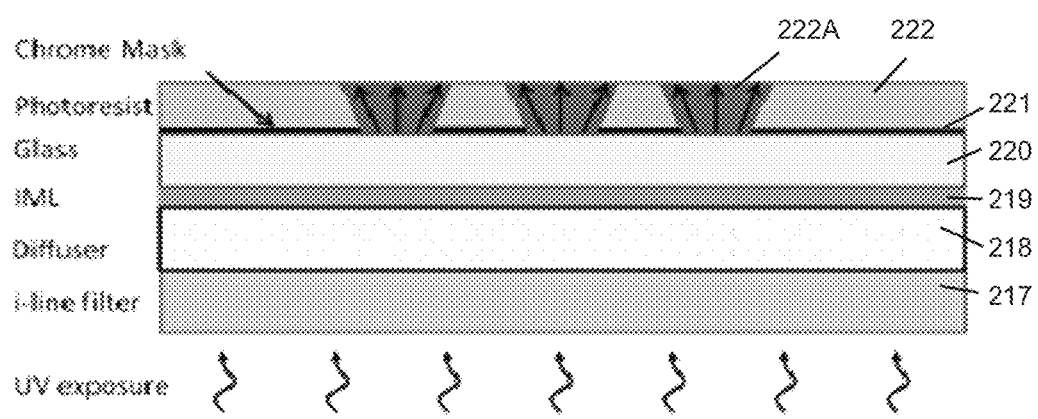
FIG._9A

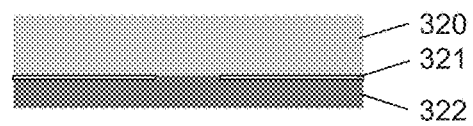
■ SU-8 photoresist
□ Chrome
▨ Fused Silica
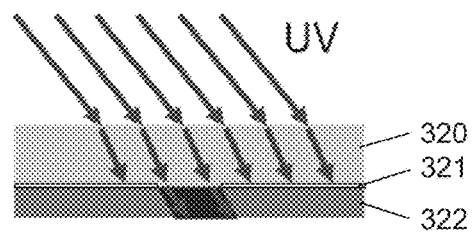
1st tilted exposure
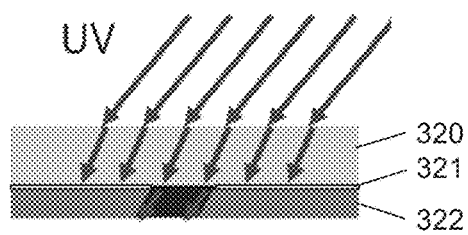
2nd tilted exposure
Development
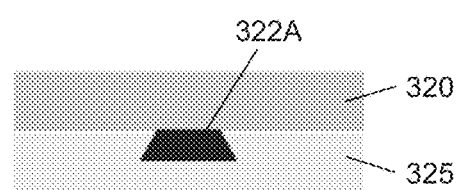
PDMS casting
FIG._10A

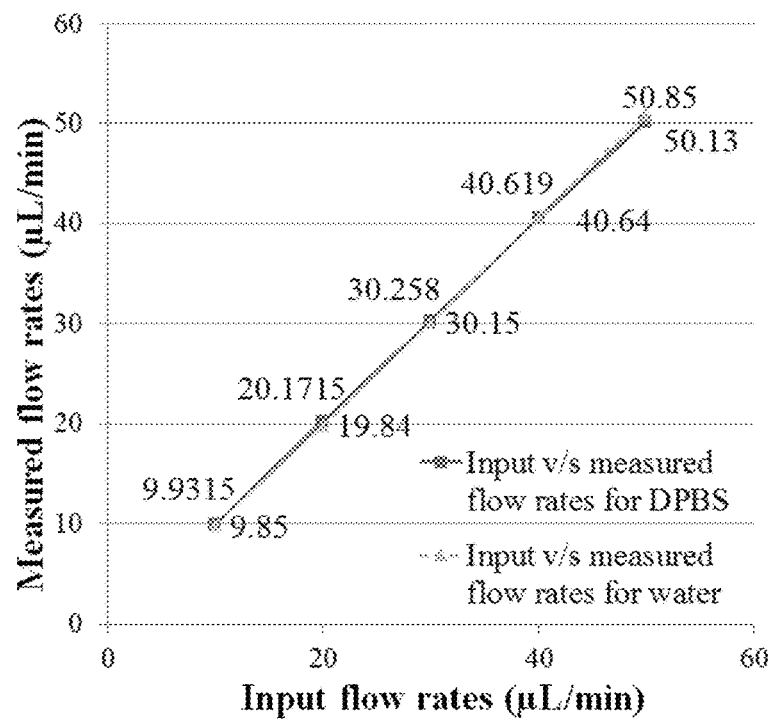
FIG._11
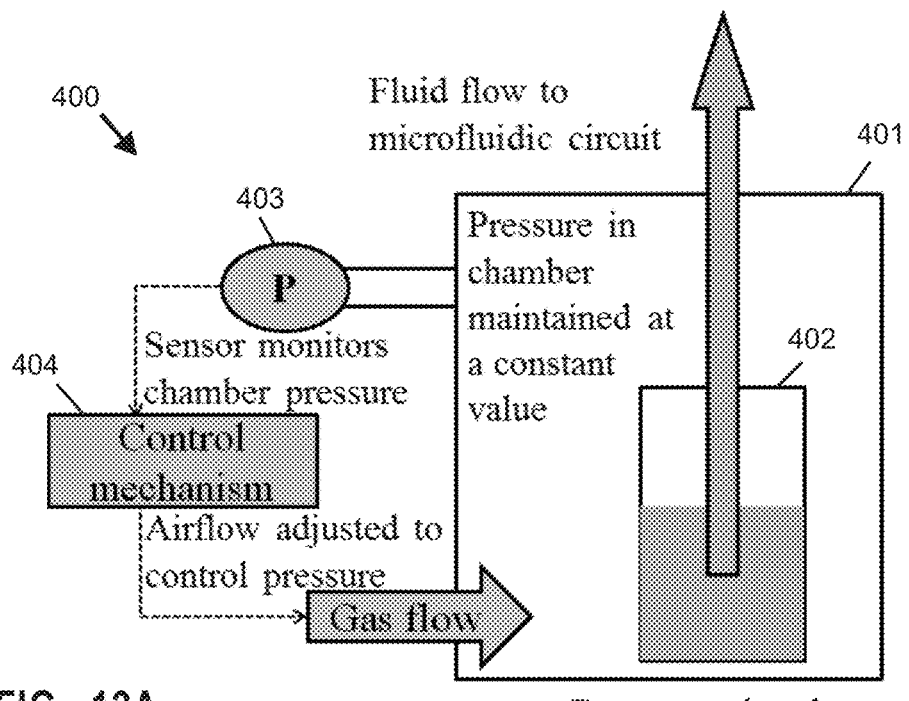
FIG._12A

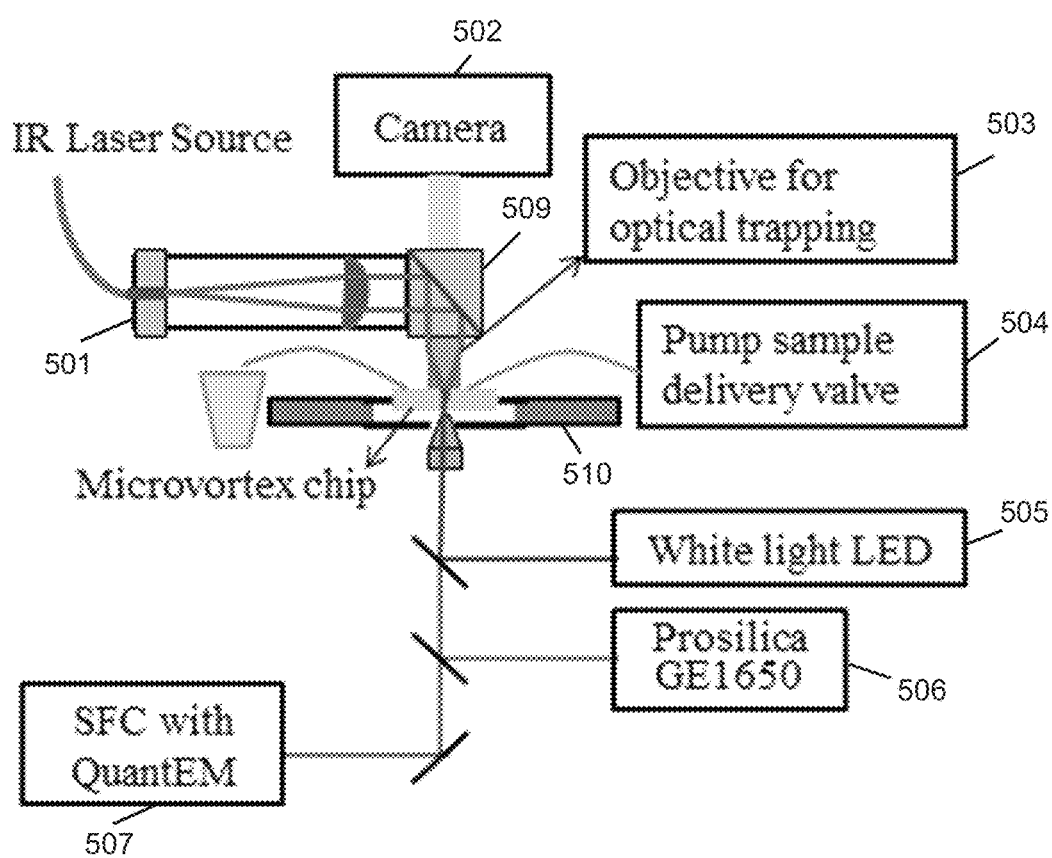
FIG._13

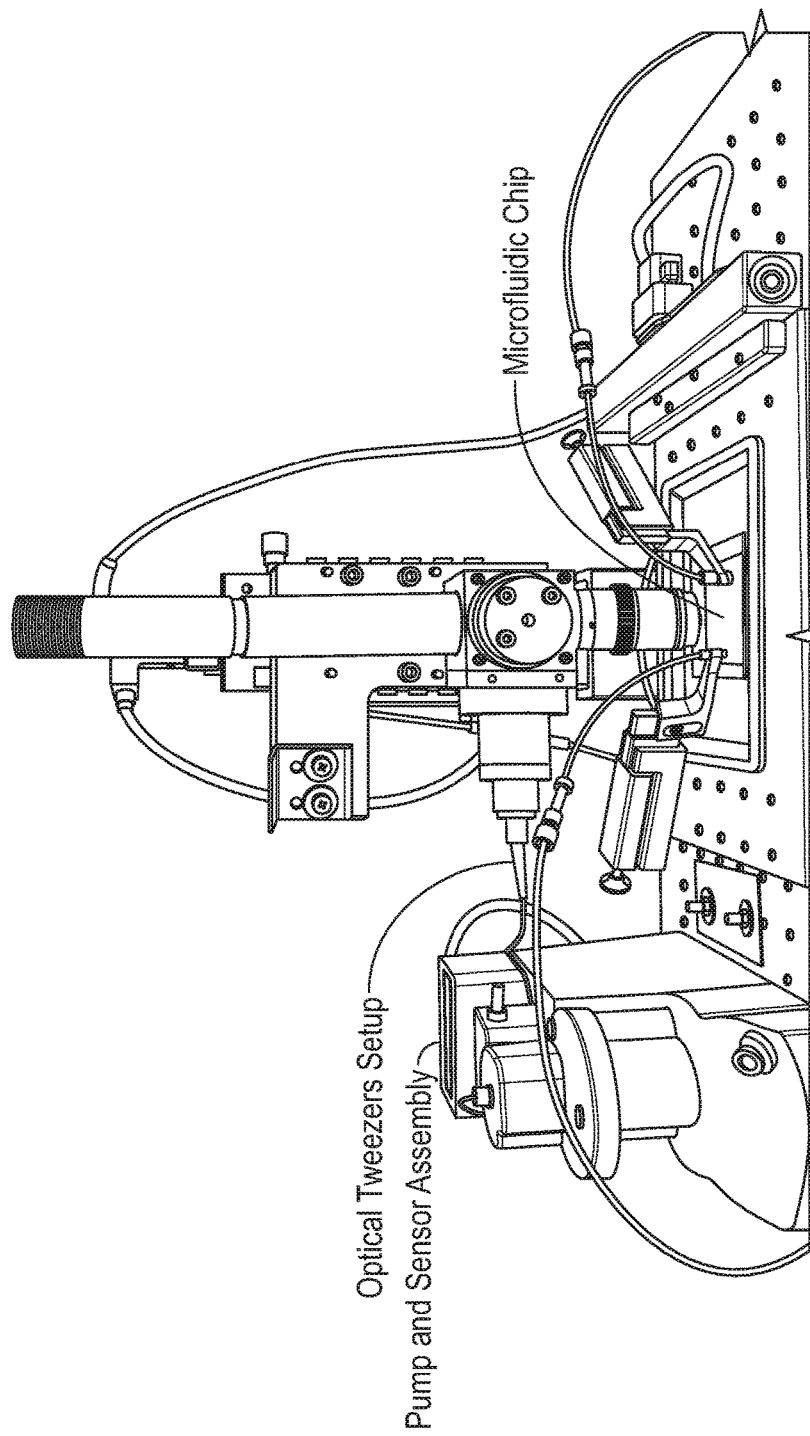
FIG._14B

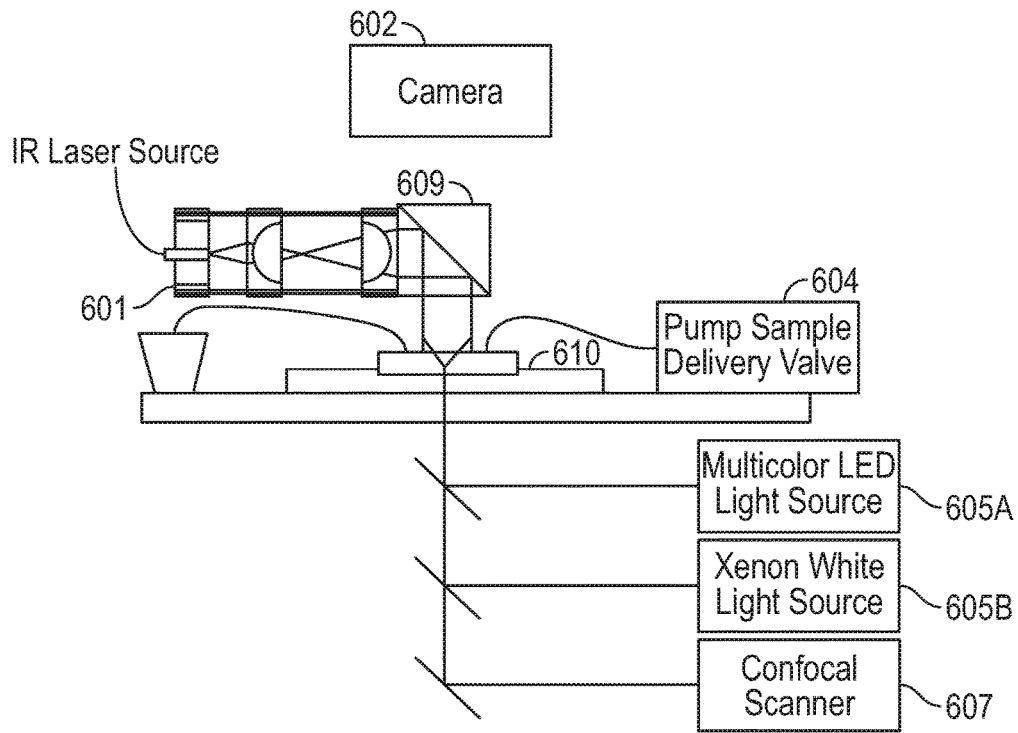
FIG._15
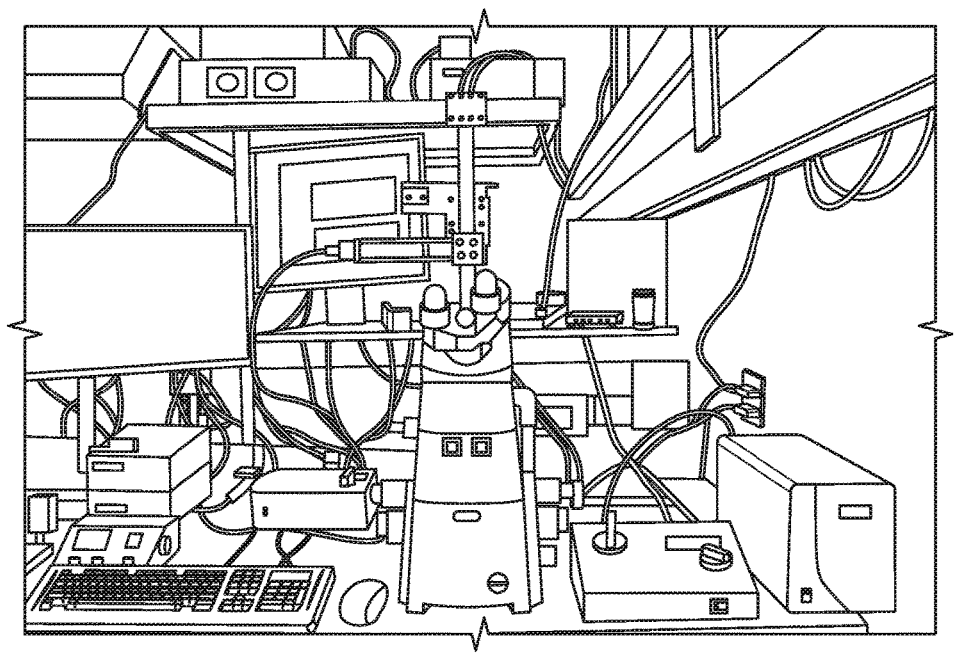
FIG._16

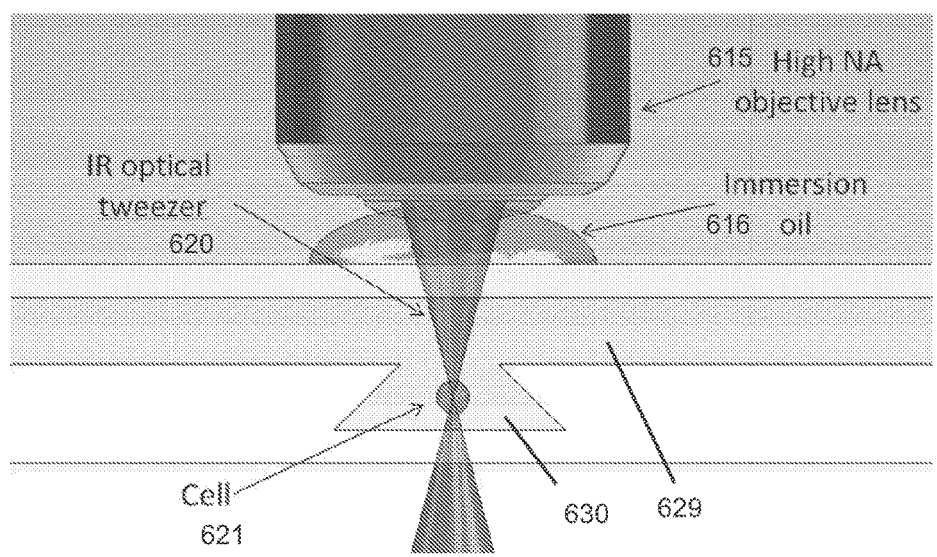
FIG._17
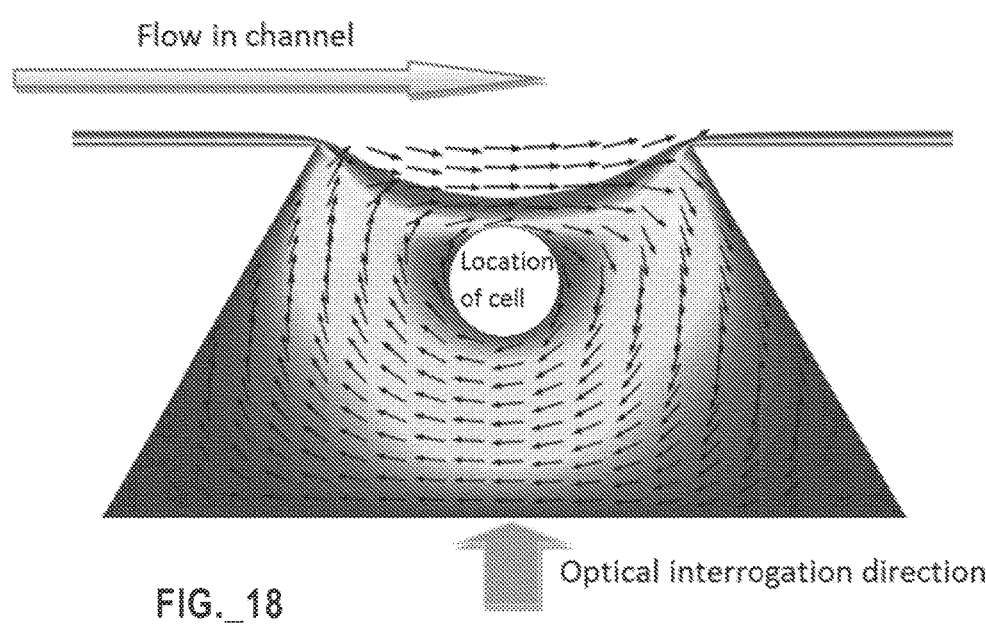
FIG._18

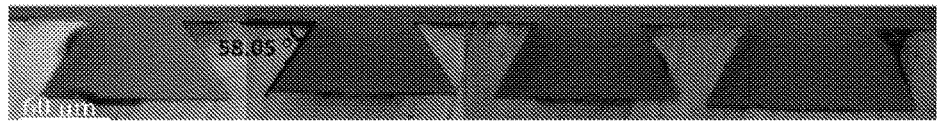
FIG._21A
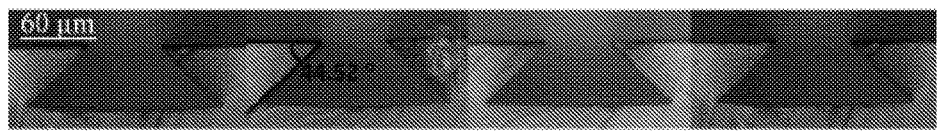
FIG._21B
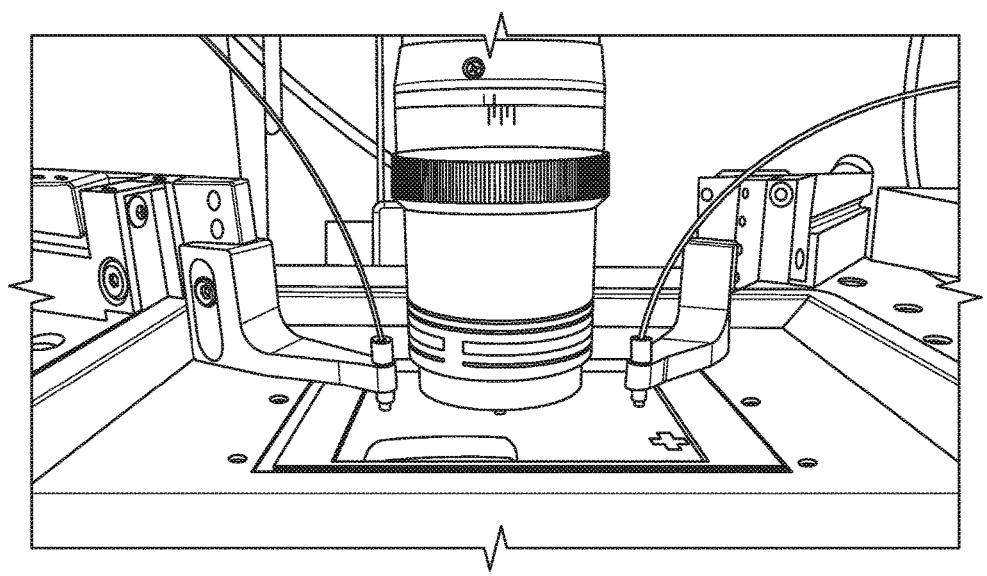
FIG._22

| Trap width (µm) | Slowest flow rate (µL/min) | Rotation rate (rev/s) | Stable flow rate (µL/min) | Rotation rate (rev/s) |
|---|---|---|---|---|
| 50 | 3-8 | 0.11-0.18 | 10-18 | 0.2-0.4 |
| 60 | 4-8 | 0.11-0.18 | 10-18 | 0.2-0.3 |
| 70 | 6-8 | 0.125-0.15 | 12-18 | 0.2-0.4 |
| 80 | 8-10 | 0.125-0.2 | 15-25 | 0.25-0.55 |
FIG. 23A
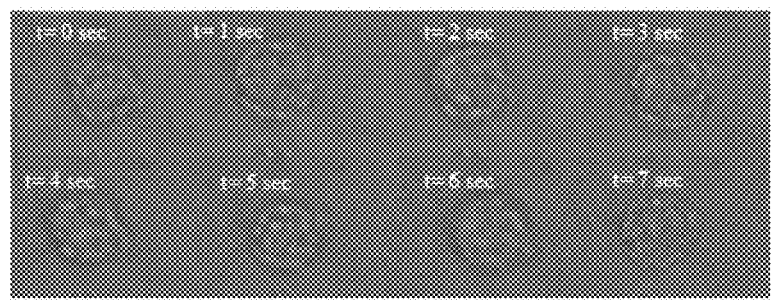
FIG. 23B
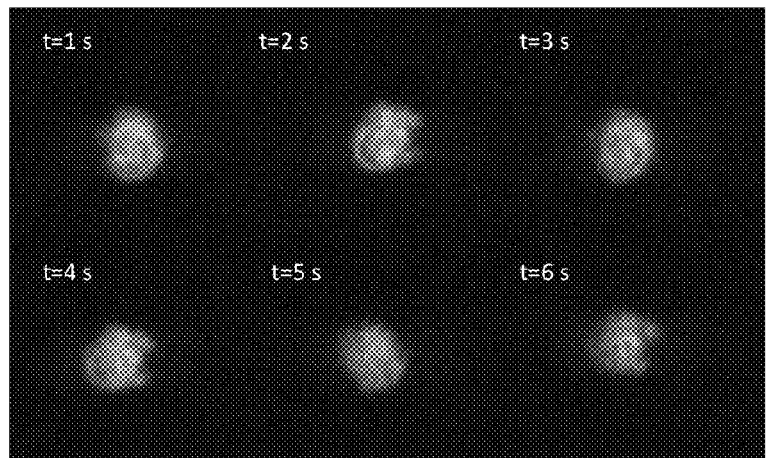
FIG. 23C

| Feature inlet width (μm) | Flow rate for channel variation (μL/min) | Flow rate for small variation (μL/min) |
|---|---|---|
| 50 | 5.5 ± 2.5 | 14 ± 4 |
| 60 | 6 ± 2 | 14 ± 4 |
| 70 | 7 ± 1 | 15 ± 4 |
| 80 | 9 ± 1 | 20 ± 5 |
FIG._24A
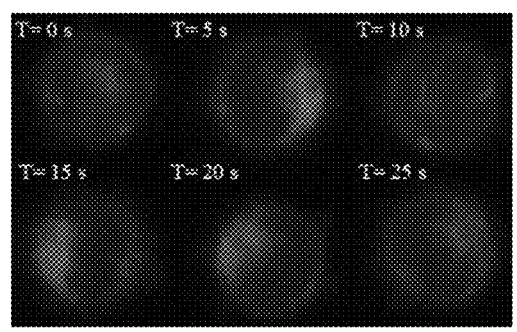
FIG._24B
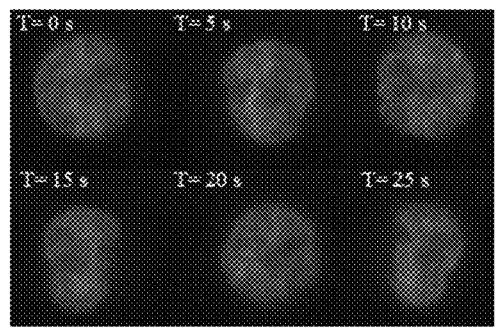
FIG._24C
FIG._24D

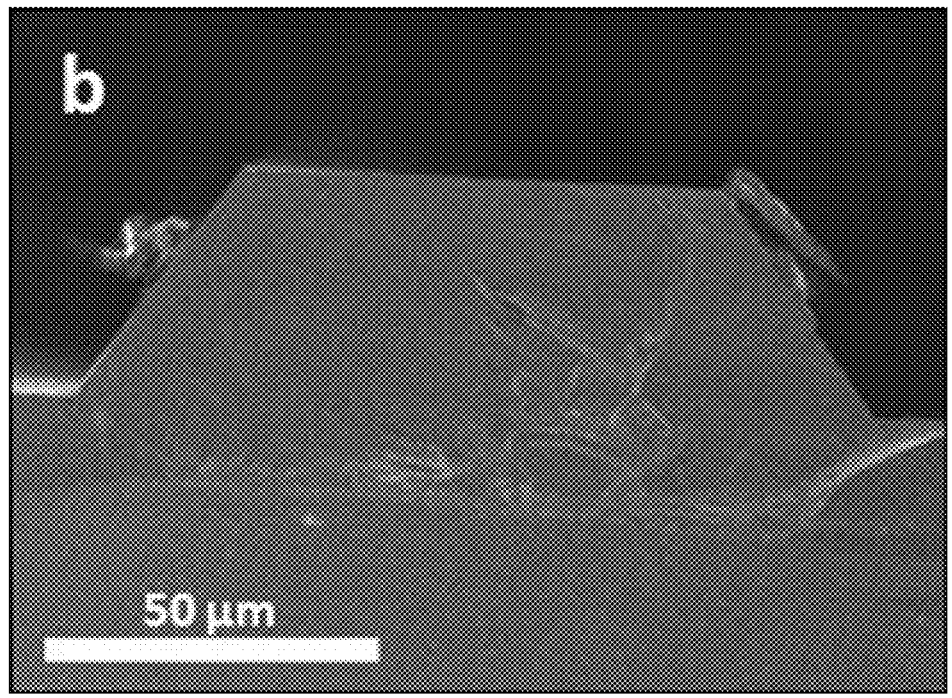
FIG._26
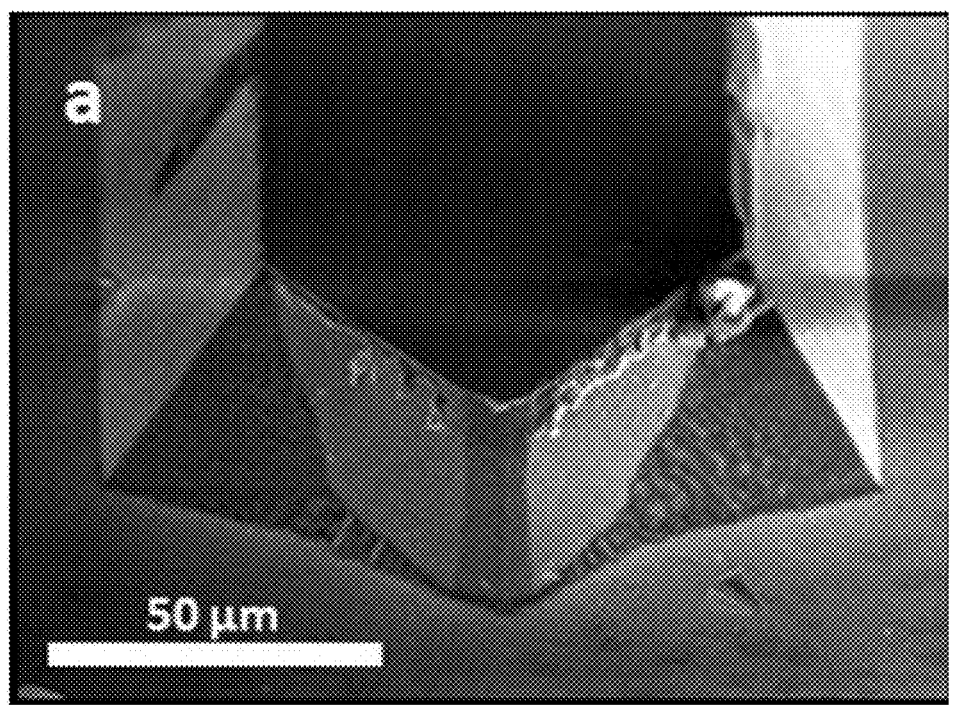
FIG._27

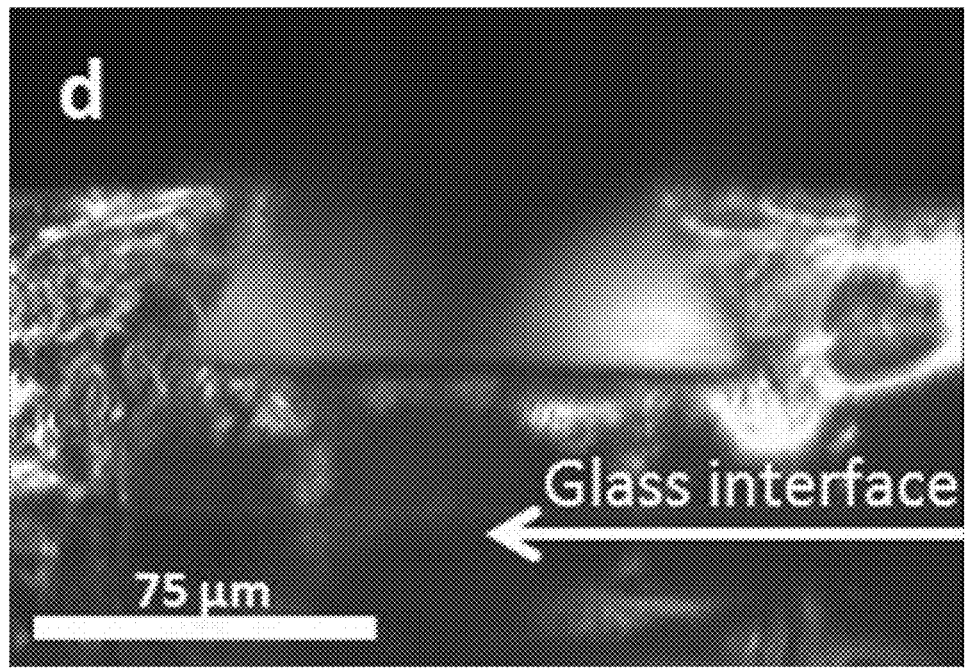
FIG._28
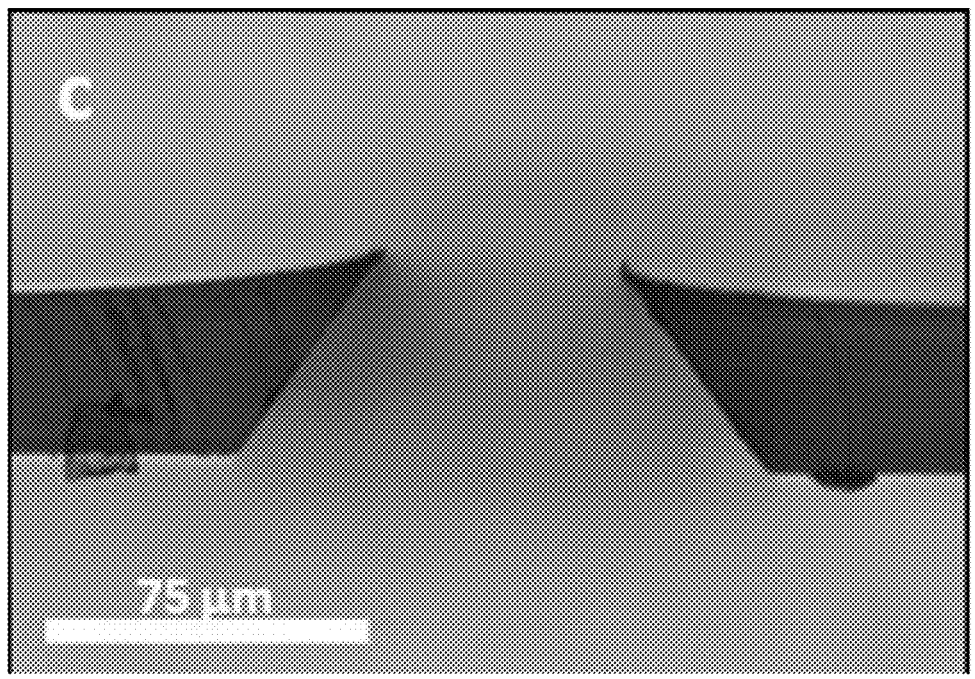
FIG._29

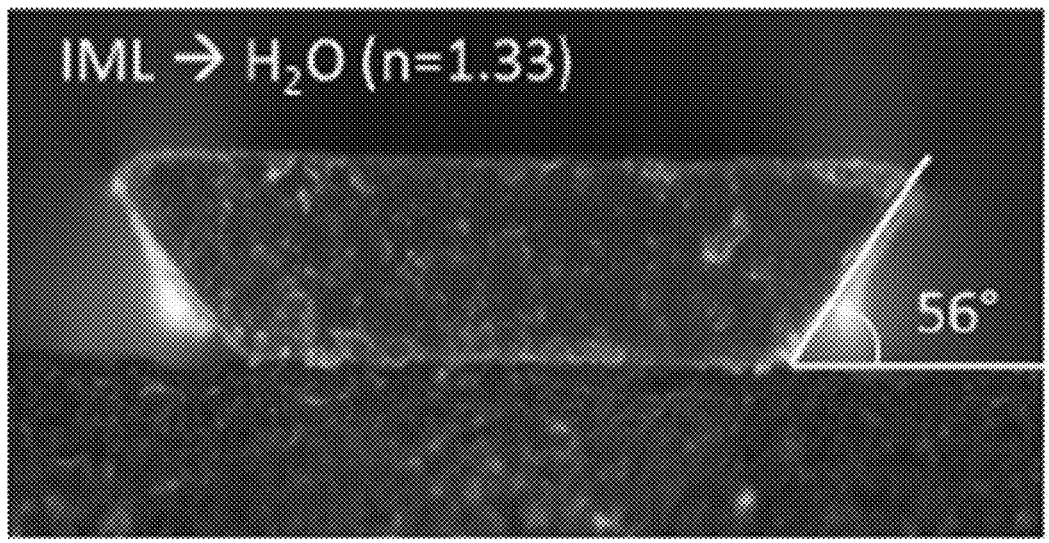
FIG._30
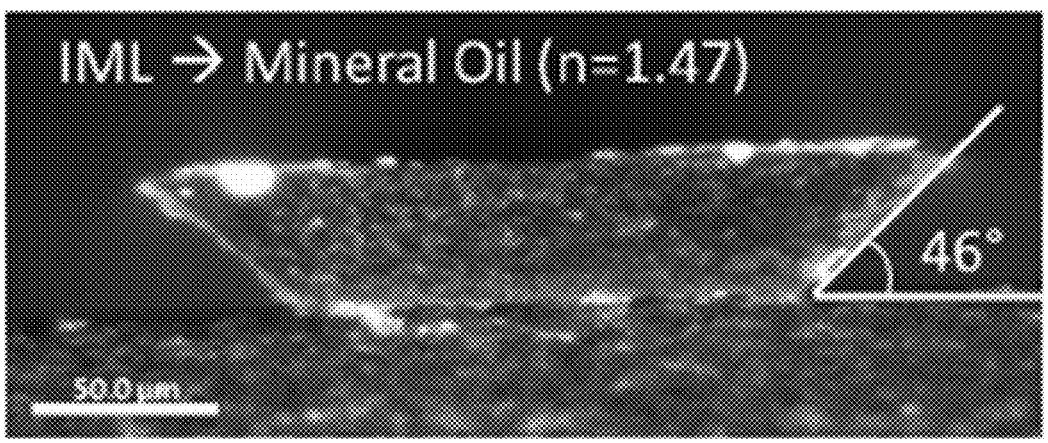
FIG._31

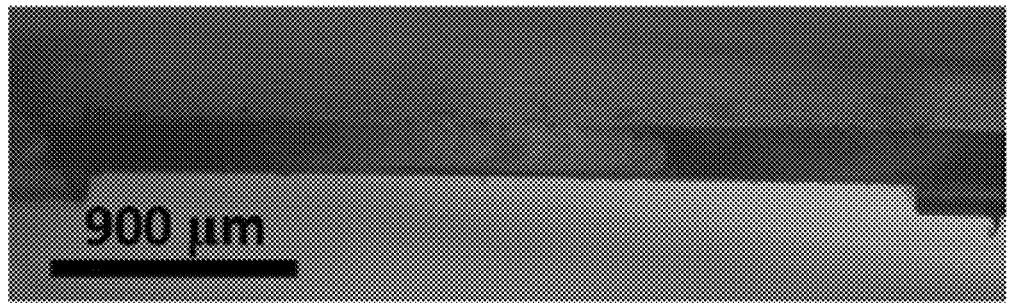
FIG._32
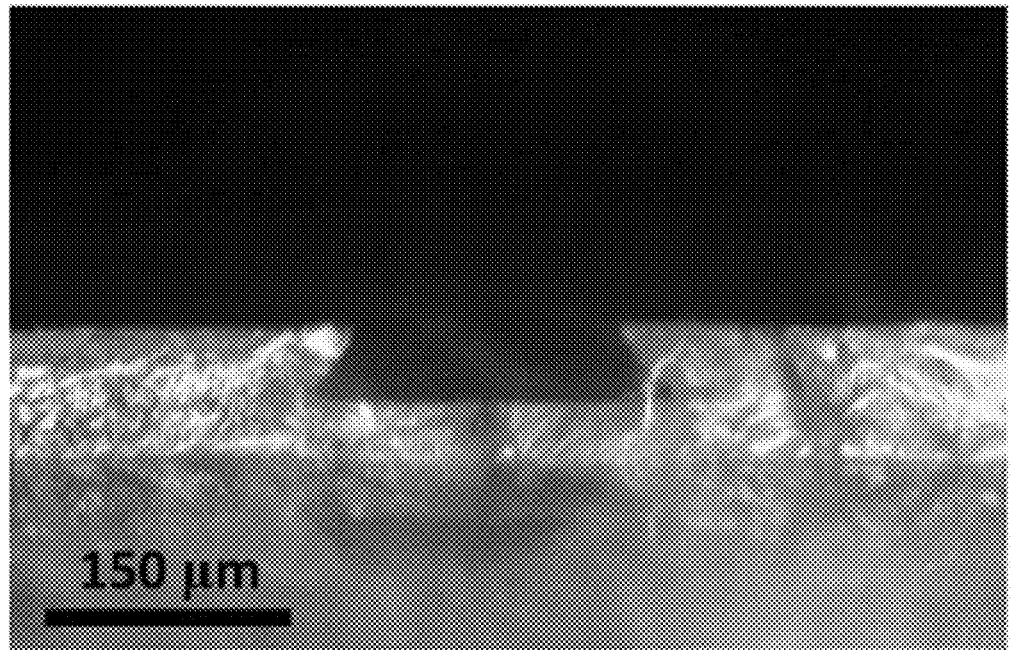
FIG._33

MICROFLUIDIC SYSTEMS AND METHODS FOR HYDRODYNAMIC MICROVORTICAL CELL ROTATION IN LIVE-CELL COMPUTED TOMOGRAPHY

CROSS-REFERENCE TO RELATED APPLICATION(S)

This application claims the benefit of U.S. Provisional Patent Application No. 62/054,839 filed on Sep. 24, 2014, with the disclosure of such application being hereby incorporated by reference herein.

TECHNICAL FIELD

This disclosure concerns fabrication and use of microfluidic devices and systems for performing live-cell or cell cluster computed tomography imaging.

BACKGROUND

To understand intracellular protein-protein and protein-nucleic acid interactions, it is critical to appreciate their spatial relationships, to assess their local concentrations in cells, and to provide this information dynamically over a time course of minutes to hours.

Computed tomography (CT) imaging of freely suspended particles, including live single cells and cell clusters, is made possible by recent developments in low-light level imaging and other detectors, microelectronics, microfluidics and high-speed computing. By studying live single cells in their microenvironments, information about particularly interesting cell lines and their phenotypes can be obtained. Single cell analysis (SCA) methods are finding increasing use for studying disease progression, development, treatment, and prognosis because conventional population based measurement techniques often mask important heterogeneous responses that are inherent to the disease state. Heterogeneity among cell populations plays an important role in diseases like cancer, and in resistance to its treatment. Therefore, SCA is recognized as an important field of study.

Microfluidic systems possess some inherent unique and advantageous attributes due to the physics of scale. For instance, they generally have low Reynolds numbers, which assures laminar flow conditions, and mass transport is diffusion dominated, providing significant advantages for mixing and dispersion, especially for live cells.

Various forces (e.g., electrical, optical, mechanical, magnetic, chemical, and thermal) have been used for single cell analysis and manipulation. Mechanical methods have been utilized for single cell and microparticle rotation using the concept of a microvortex; which relies on the creation of a recirculating flow profile. (Shelby J P, Chiu D T. "Controlled rotation of biological micro- and nano-particles in microvortices." Lab Chip. 2004; 4(3):168-70.) The center of the microvortex is the site of a trapping force, which is locally induced by the flow velocity gradient in that region. Rotation of a cell 1 about an axis 2 parallel to the optical axis 3 (e.g., 2D rotation) is schematically illustrated in FIG. 1A. One way of rotating single cells about an axis parallel to the optical axis using microvortices is to fabricate channels with diamond shaped side chambers, thus allowing flow to be peeled off from the main channel and become recirculant in the side channel, thereby forming a microvortex. (Lim D S W, Shelby J P, Kuo J S, Chiu D T. "Dynamic formation of ring-shaped patterns of colloidal particles in microfluidic systems." Appl. Phys. Lett. 2003; 83(6):1145.) The dimensions of the opening chamber and especially its opening angle and aspect ratio are important factors that affect stability of the microvortex. To exert better control on the cells during rotation, an optical trap may be used to position the cell at the center of the microvortex. (Neuman K C, Block S M. "Optical trapping." Rev. Sci. Instrum. 2004; 75(9):2787-809.)

Many diseases arise from genomic changes, some of which manifest at the cellular level in cytostructural and protein expression features which can be resolved, captured, and quantified in 3D-microscopy far more sensitively and specifically than in traditional 2D-microscopy. Volumetric cell imaging using 3D optical Computed Tomography (cell CT) would be advantageous for identification and characterization of various cells, including cancer cells. To perform 3D imaging, it is necessary to have the ability to hold microscopic particles precisely in free suspension and to slowly rotate them. Rotation of a cell 1 about an axis 4 perpendicular to the optical axis 3 (e.g., 3D rotation, to permit 3D imaging) is schematically illustrated in FIG. 1B. It can be tricky to prepare devices capable of 3D rotation of one or more cells to enable 3D microscopy such as live-cell or cell cluster computer tomography imaging. Aspects of this disclosure address shortcomings associated with conventional systems and methods.

SUMMARY

Aspects of this disclosure relate to devices for 3D hydrodynamic microvortical rotation of at least one live single cell or cell cluster, systems incorporating such devices, and methods of fabricating and using such devices and systems. A microfluidic chip rotates at least one live single cell or cell cluster about a stable rotation axis perpendicular to an optical axis. The cell or cell cluster is optically trapped in the center of a recirculant flow stream in a microfluidic chip.

In certain aspects, the disclosure relates to a device for 3D hydrodynamic microvortical rotation of at least one live single cell or cell cluster, the device comprising a microfluidic flow channel and at least one microfluidic chamber arranged below the microfluidic flow channel, wherein: the at least one microfluidic chamber comprises an inlet opening arranged along a lower boundary of the microfluidic flow channel, wherein the inlet opening permits fluid communication between the at least one microfluidic chamber and the microfluidic flow channel; and the at least one microfluidic chamber comprises a trapezoidal cross-sectional shape transverse to a primary direction of flow in the microfluidic flow channel.

In certain embodiments, the disclosure relates to a method of fabricating a device as disclosed herein via at least one step including soft lithography.

In certain embodiments, the disclosure relates to a method of fabricating a device as disclosed herein via at least one step including backside diffuser photolithography.

In certain embodiments, the disclosure relates to a method of fabricating a device as disclosed herein via at least one step including multi-step backside tilted exposure photolithography.

In certain embodiments, the disclosure relates to a method of fabricating a device as disclosed herein via at least one step including soft stamping.

In certain aspects, the disclosure relates to using a device as disclosed herein, the method including supplying at least one live single cell or cell cluster to the at least one microfluidic chamber, and flowing fluid through the microfluidic flow channel to establish a microvortex in the at least one microfluidic chamber and thereby rotate the at least one live single cell or cell cluster. Preferably, at least one live single cell or cell cluster is rotated within the at least one microfluidic chamber around an axis perpendicular to an optical or visual axis by which the at least one live single cell or cell cluster is imaged.

In certain aspects, an optical tweezer device or optical trap is used to perform at least one of the following functions: facilitate introduction of the at least one live single cell or cell cluster into the at least one microfluidic chamber, stabilize rotation of the at least one live single cell or cell cluster in a microvortex in the at least one microfluidic chamber, trap the at least one single live cell or cell cluster at a desired location within the device, and transport the at least one live single cell or cell cluster to a desired location within the device.

In certain aspects, an imaging apparatus is arranged in sensory communication with the at least one microfluidic chamber to generate a 3D image of the at least one live single cell or cell cluster.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1A schematically illustrates rotation of a cell about an axis parallel to an optical axis (e.g., 2D rotation).

FIG. 1B schematically illustrates rotation of a cell about an axis perpendicular to an optical axis (e.g., 3D rotation).

FIG. 2 is a cross-sectional view of a trapezoidal chamber and provides geometric considerations for trapezoidal feature dimensions.

FIG. 3 is a perspective view of a flow channel arranged over and in fluid communication with a trapezoidal chamber disposed below the flow channel.

FIG. 4 provides 2D surface plots of fluid velocity magnitude with arrow plots of the normalized velocity field (an indication of flow direction) in microchambers having different wall angles of 30°, 60°, and 90°, respectively.

FIG. 5 is a plot of displacement of the microvortex center from the microchamber inlet (µm) versus aspect ratio according to COMSOL computational fluid dynamics simulation results for trapezoidal microchambers with various incident angles (30°, 60°, and 90°) and aspect ratios.

FIG. 6 is a plot of maximum shear rate (1/s) versus aspect ratio according to COMSOL computational fluid dynamics simulation results for trapezoidal microchambers with various incident angles (30°, 60°, and 90°) and aspect ratios.

FIG. 7B illustrates a positive mesa structure.

FIG. 7C illustrates a polymer negative formed from a mold including a mesa structure conforming to the mesa of FIG. 7B.

FIG. 7D schematically illustrates a device fabricated using the polymer negative of FIG. 7C, with obtuse bottom angles of the trapezoidal chamber being unsuitable to create a recirculating pattern for retaining cells.

FIG. 9A illustrates a backside diffuser photolithography assembly.

FIG. 10A is a schematic of backside inclined exposure, development, and PDMS casting steps for performing multi-step backside tilted (or inclined) exposure photolithography to produce a mold suitable for producing a microfluidic device with at least one trapezoidal chamber.

FIG. 11 illustrates flow rate calibration for DPBS buffer in comparison to water for the sensor, expressed as measured flow rate versus input flow rate.

FIG. 12A is a simplified schematic of a microfluidic pump-sensor assembly.

FIG. 13 is a schematic of the physical system setup of an optical trapping and imaging system incorporating a microfluidic device with at least one trapezoidal chamber suitable for generating a recirculating flow pattern.

FIGS. 14A-14B are illustrations showing an optical trapping and imaging setup as schematically illustrated in FIG. 13.

FIG. 15 is a schematic of a physical system setup of a modified optical trapping and imaging system incorporating a microfluidic device with at least one trapezoidal chamber suitable for generating a recirculating flow pattern.

FIG. 16 is an illustration showing an optical trapping and imaging setup as schematically illustrated in FIG. 15.

FIG. 17 is a schematic showing an IR optical tweezer including a high NA objective lens, immersion oil, and a microfluidic trapezoidal chamber.

FIG. 18 is a schematic showing rotation of a cell about an axis perpendicular to an optical interrogation direction.

FIGS. 21A-21B are cross-sectional images of trapezoidal features after PDMS casting.

FIG. 22 is an illustration of a microfluidic device as disclosed herein proximate to an imaging apparatus.

FIG. 23A is a table providing rotation datasets of cells rotated in a trapezoidal chamber.

FIGS. 23B-23C are photographs showing rotation of cells corresponding to the data of FIG. 23A.

FIG. 24A is a table providing rotation datasets of cells rotated in a trapezoidal chamber.

FIGS. 24B-24C are photographs showing rotation of cells corresponding to the data of FIG. 24A.

FIG. 24D is a table providing X and Y offset data for cells rotated in a trapezoidal chamber.

FIGS. 26-33 are photographs of microstructures fabricated according to the methods disclosed herein.

DETAILED DESCRIPTION

Figure 7A:
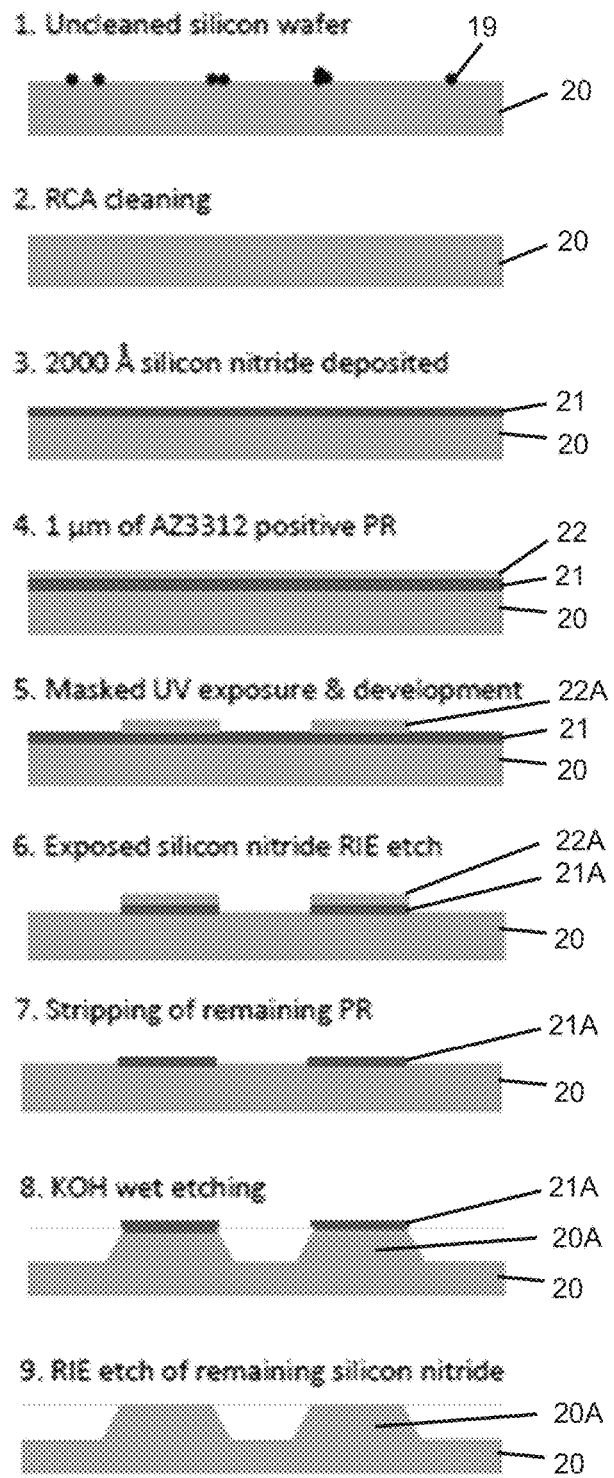
FIG. 7A illustrates steps of production of positive mesa structures by anisotropic etching of silicon.

Aspects of this disclosure relate to devices for 3D hydrodynamic microvortical rotation of at least one live single cell or cell cluster, systems incorporating such devices, and methods of fabricating and using such devices and systems. Such rotation may be used to rotate one or more cells about a stable rotation axis differing from (and preferably perpendicular to) the optical or visualization axis. At least one cell may be optically trapped in the center of a recirculant flow stream (microvortex) in a microfluidic chip. A trapezoidal microchamber is arranged below and in fluid communication with a main flow channel to create flow detachment into the microchamber and produce recirculating flow conditions. Use of a trapezoidal microchamber is particularly beneficial since its flat back surface provides interference-free imaging on a plane parallel to the axis of rotation. A single cell or cell cluster may be flowed through the main channel, held in the center of the microvortex by an optical trap, and rotated by the fluidic shear forces induced by the recirculating flow. This arrangement facilitates multi-perspective data acquisition with minimal perturbation of cell function.

Through the use of the disclosed microfluidic device and accompanying optical trapping system, a single cell or cell cluster can be rotated using hydrodynamics while procuring proper imaging characteristics. This can be done in bright-field or fluorescence mode microscope, or used for 3D tomographic imaging to allow high resolution volumetric images. Such imaging can beneficially provide biologists with a complete view of a cell, rather than just the two-dimensional view that is normally employed.

Microvortex Based Simulation Results

After various feature geometries were probed in order to find the optimal feature that would allow formation of a stable and strong microvortex, it was found that a trapezoidal feature would be advantageous to achieve the goal of high resolution, interference-free imaging, owing to its flat-backed surface when viewed through an inverted microscope. The important parameters to be considered while simulating were the sidewall angle, microchamber height, microchamber inlet width, and their influences on the recirculating flow profiles.

A trapezoidal feature positioned below the flow channel allows for the generation of microvortices with recirculant flows. The center of the microvortex is the site of a trapping force, which is locally induced by the flow velocity gradient in that region. Thereafter, the shear force from the recirculant flow in the microvortex causes the rotation of the cell. In order to use this method to rotate cells about an axis perpendicular to the optical axis, a trapezoidal feature (namely, a microfabricated trapezoidal chamber) positioned below a flow channel allows for the generation of microvortices with recirculant flows. FIG. 2 is a cross-sectional view of a trapezoidal chamber 11 located below a flow channel 10, and provides geometric considerations for trapezoidal feature dimensions (including an inlet width $W_i$, a feature height $H_f$, and an incident angle $\phi$). FIG. 3 is a perspective view of a flow channel 10 arranged over and in fluid communication with a trapezoidal chamber 11, with a straight arrow 13 depicting the axis of rotation of a vortex within the trapezoidal chamber 11, and with a curved arrow 14 depicting the direction of rotation of the vortex when fluid flows within the flow channel 10 from right to left. As illustrated in FIG. 3, the inlet opening 12 of the trapezoidal chamber 11 is transversely arranged relative to the flow channel 10.

Flow simulation was performed via computational fluid dynamics (CFD) using Comsol Multiphysics v4.2a (COMSOL Inc.). To solve for the velocity field in the microchannel, the flow was assumed to be steady state, incompressible, and laminar. The models made use of the conservation equations for mass and momentum with a defined set of boundary equations to solve for the velocity field and the pressure across the computational domain. The characteristic geometry used included a 100 μm thick channel and trapezoidal features with different inlet widths; the average inlet velocity was defined as 20 μm/sec with a parabolic profile and a maximum velocity of 30 μm/sec. The outlet condition was defined as having zero pressure and no viscous stresses. The channel top and bottom, along with the boundaries created by the microfeatures were defined as no-slip walls. The inlet width and feature height were set to 50 μm and the incident angle was varied from 30°-90°.

Simulation results from COMSOL were illustrated through a 2D surface plot of fluid velocity magnitude and an arrow plot of the normalized velocity field (an indication of flow direction) within microchambers with side wall characteristics, as shown in FIG. 4 (including frames A, B, and C with incident angles of 30°, 60°, and 90°, respectively, and a color scale range of 0.0-1.5 μm/s). As shown in FIG. 4, the velocity decreases as the incident angle increases from the leftmost frame A to the rightmost frame C, with velocity being highest proximate to the inlet opening of each trapezoidal chamber, and velocity being lowest proximate to lower corners of each trapezoidal chamber. It can be seen that the amount of flow detached from the main channel was directly related to the incident angle of the microchamber geometry; and as this angle increased, the amount of flow detached and contributing to microvortex formation consequently decreased. In addition, differences in flow circularity and hence, effective microvortex formation, were also seen with the smaller incident angle lending a better flow profile for the end use. The effect of aspect ratio (height versus width) on the microvortex center displacement (from the chamber inlet) was studied, and was considered to be important owing to the varied levels of shear forces that the cell would experience depending on its position in the vortex. It became apparent, as can be seen in FIG. 5, that the sidewall angle did not have a large bearing at smaller aspect ratios; and features with aspect ratios of 0.5 were less susceptible to high velocity streams near the channel inlet, while features with aspect ratios of 2 showed a larger distribution of vortex displacement depending on the sidewall angle. These results were corroborated when plotting a graph of maximum shear rate vs. aspect ratio as seen in FIG. 6, where as expected, the features with aspect ratios of 0.5 experienced the least amount of shear stress and the trend of inverse variance with the vortex displacement held reliably. Finally, a study of rotation rate as a function of aspect ratio for the three different sidewall angles was also performed. It was concluded that a 30° sidewall angle with an aspect ratio of 2 would yield the ideal microvortex for stable cell rotation. However, short working distances employed for high-resolution imaging limited the ability to increase the aspect ratio to 2. As shown in FIG. 5, the displacements of the center of the microvortex from the chamber inlet were about 18 µm, irrespective of the incident angles (30°, 60°, and 90°). Instead, these displacements depended on the aspect ratio (feature height/inlet width). Features with aspect ratios of 0.5 or 1.5 were less susceptible to high velocity streams near the channel inlet and also had lower shear rates.

It has been observed that larger inlet width vortices require longer form and start rotating, owing to the larger volume to be swept, whereas it is easier to get cells to rotate in smaller vortices that are tighter.

Micro Fabrication Techniques

An initial attempt to produce a microfluidic device with a trapezoidal cross-sectional shape utilized anisotropic etching of a silicon substrate 20 to produce positive mesa structures 20A (i.e., direct replication) as shown in FIG. 7A. A silicon substrate 20 is cleaned via a conventional RCA process to remove particulate 19 and other contaminants. Thereafter, a 2000 Angstrom silicon nitride layer 21 is deposited on the silicon substrate 20, and a 1 µm layer of AZ3312 positive photoresist 22 is deposited on the silicon nitride layer 21. The layer of photoresist 22 is subjected to masked UV exposure and development to yield a photoresist pattern 22A. Thereafter, exposed regions of the silicon nitride layer 21 are subject to reactive ion etching (RIE), whereby only regions 21A of the silicon nitride layer 21 covered by the photoresist pattern 22A remain. The remaining photoresist islands 22A are stripped, the silicon substrate is subject to KOH wet etching to define positive mesa structures 20A, and the remaining silicon nitride regions 21A are removed by RIE. A single positive mesa structure 20A extending upward from a silicon substrate 20 is shown in FIG. 7B. The positive mesa structures 20A were then compressed against a positive glass channel counterpart to form a mold, and the mold was replicated to form a polymer negative 25 as shown in FIG. 7C. The polymer negative 25 was sealed by bonding 170-µm microscope cover glasses 27, 28 to upper and lower sides of the polymer negative 25 to form a fluidic device, as shown in FIG. 7D, with a flow channel 29 and a trapezoidal chamber 30 defined between the polymer negative 25 and the upper cover glass 27. This technique had limitations as far as the geometry of the trapezoid was concerned, since the bottom angles of the trapezoid (i.e., the front wall 31 and the rear wall 32) were obtuse, and therefore unable to retain cells by creating a recirculating pattern. This unsuccessful attempt to create a microfluidic device suitable for generating a recirculating flow pattern led to the creation of new device fabrication techniques suitable for generating traps with acute bottom angles, as described below.

Figure 8:
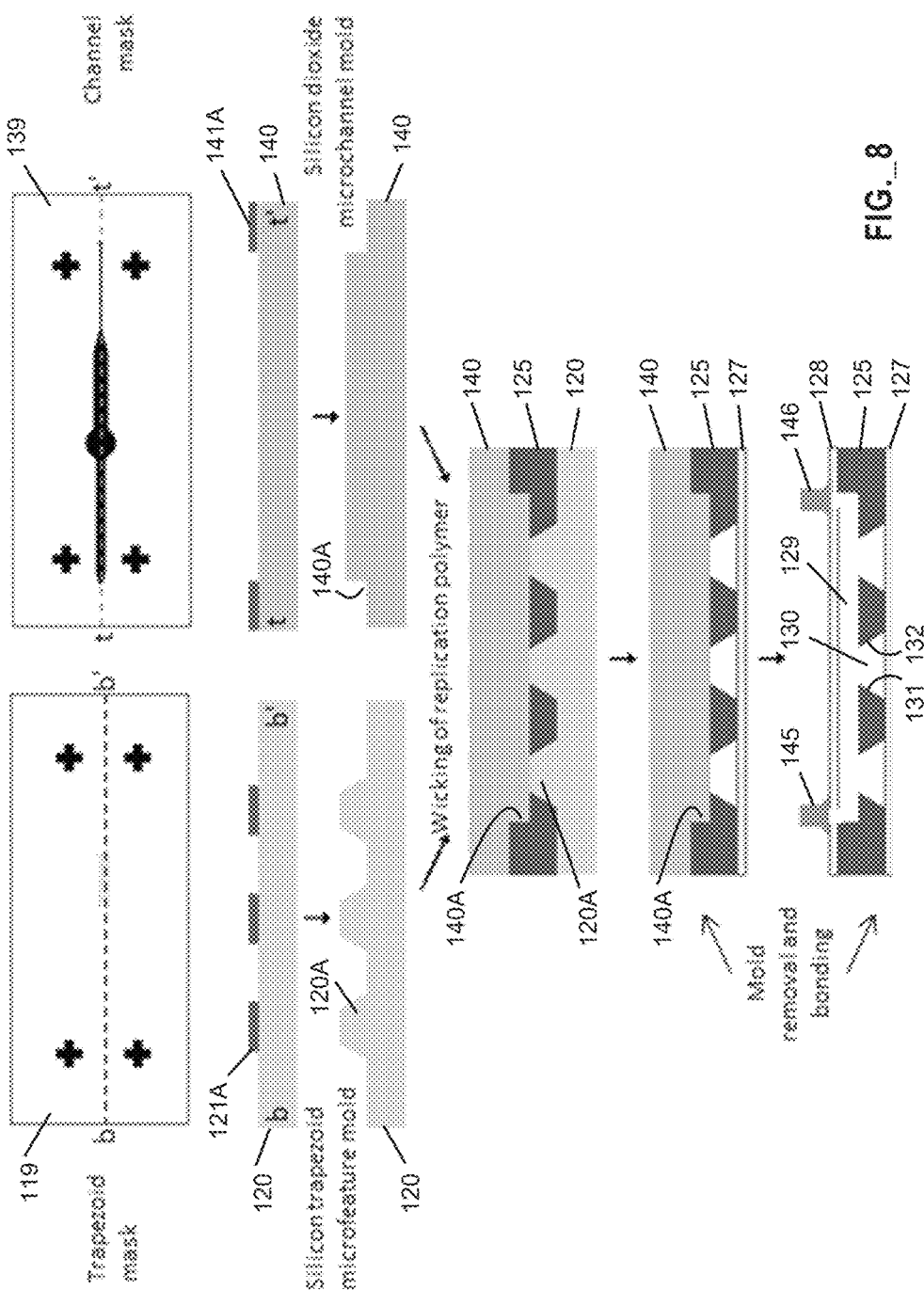
FIG. 8 illustrates steps of a method for producing a microfluidic device with at least one trapezoidal chamber suitable for generating a recirculating flow pattern utilizing soft-lithography.

A first method for producing a microfluidic device with at least one trapezoidal chamber suitable for generating a recirculating flow pattern utilizes soft-lithography and is shown in FIG. 8. Such method utilizes a trapezoid mask 119 and a channel mask 139 to prepare two positive molds, namely, one mold 120 for the microchamber(s) and another mold 140 for the main channel. Photolithographic processes are used to deposit patterned (e.g., silicon nitride) regions 121A, 141A on a first (e.g., silicon) substrate 120 and a second (e.g., silicon dioxide or borosilicate glass) substrate 140. Thereafter, the first substrate 120 is etched to form trapezoidal mesas 120A and the second substrate 140 is etched to form recesses 140A. The two substrates 120, 140 embody molds and are compressed together, with spaces therebetween filled with replication polymer material (e.g., by wicking) to produce a single ultra-thin (<200 µm) negative 125 used for device assembly. This sandwich assembly method requires two microfabricated wafers 120, 140 to be compressed together to form the two-part mold. In certain embodiments, one half of the mold is a silicon substrate 120 containing anisotropically etched microfeatures with oblique sidewalls, while the other half of the mold is a 500 µm thick borosilicate glass (Borofloat 33) substrate 140 containing a positive microchannel feature in the shape of a microchannel. In certain embodiments, the positive microchannel feature may be defined by cutting the microchannel geometry out of a piece of high tack semiconductor dicing tape (Semiconductor Equipment) with a $CO_2$ laser system (Universal Laser Systems XL-9200) to form a channel mask 139 that adheres it to the second substrate 140. The dicing tape acts as a mask for a wet etch process, during which the entire second substrate 140 aside from the channel mask may be etched. The second substrate 140 may be isotropically etched in a 49% hydrofluoric acid for 10 minutes, yielding a channel thickness of approximately 100 µm. The two substrates 120, 140 embodying halves of the mold may be coated with a monolayer of PDMS by a known surface modification protocol (e.g., described by M. J. Lee et al., 2006). Through this anti-adhesion protocol, unconventional materials can be used for the soft lithographic replication. Following formation of the negative 125, first and second cover glasses 127, 128 are mounted to the negative 125 following sequential removal of the two substrates 120, 140. Thereafter, fluidic ports 145, 146 are added to the upper cover glass 128 to provide fluidic access to a flow channel 129 and trapezoidal chambers 130 defined therebetween. As shown, each trapezoidal chamber 130 includes front and rear walls 131, 132 disposed at acute angles suitable for generating a recirculating flow pattern therein.

A second method for producing a microfluidic device with at least one trapezoidal chamber suitable for generating a recirculating flow pattern utilizes backside diffuser photolithography (BDPL) to produce undercut inverse trapezoids on a glass surface to serve as the mold. A backside diffuser photolithography assembly is shown in FIG. 9A, wherein photoresist 222 is arranged over a patterned chrome mask 221 that is arranged over a glass layer 220, an index matching layer 219, a diffuser layer 218, and an i-line filter layer 217, with the entire stack exposed to ultraviolet radiation through the i-line filter layer 217. The process was optimized for SU-8 2035 (using an Omega filter, index matching layer and a diffuser), a thick negative photoresist, and required the development of an adhesion promotion protocol (including silanization and a sacrificial SU-8 2005 layer) to ensure the resulting raised trapezoidal mesas 222A remained intact during processing.

Figure 9B:
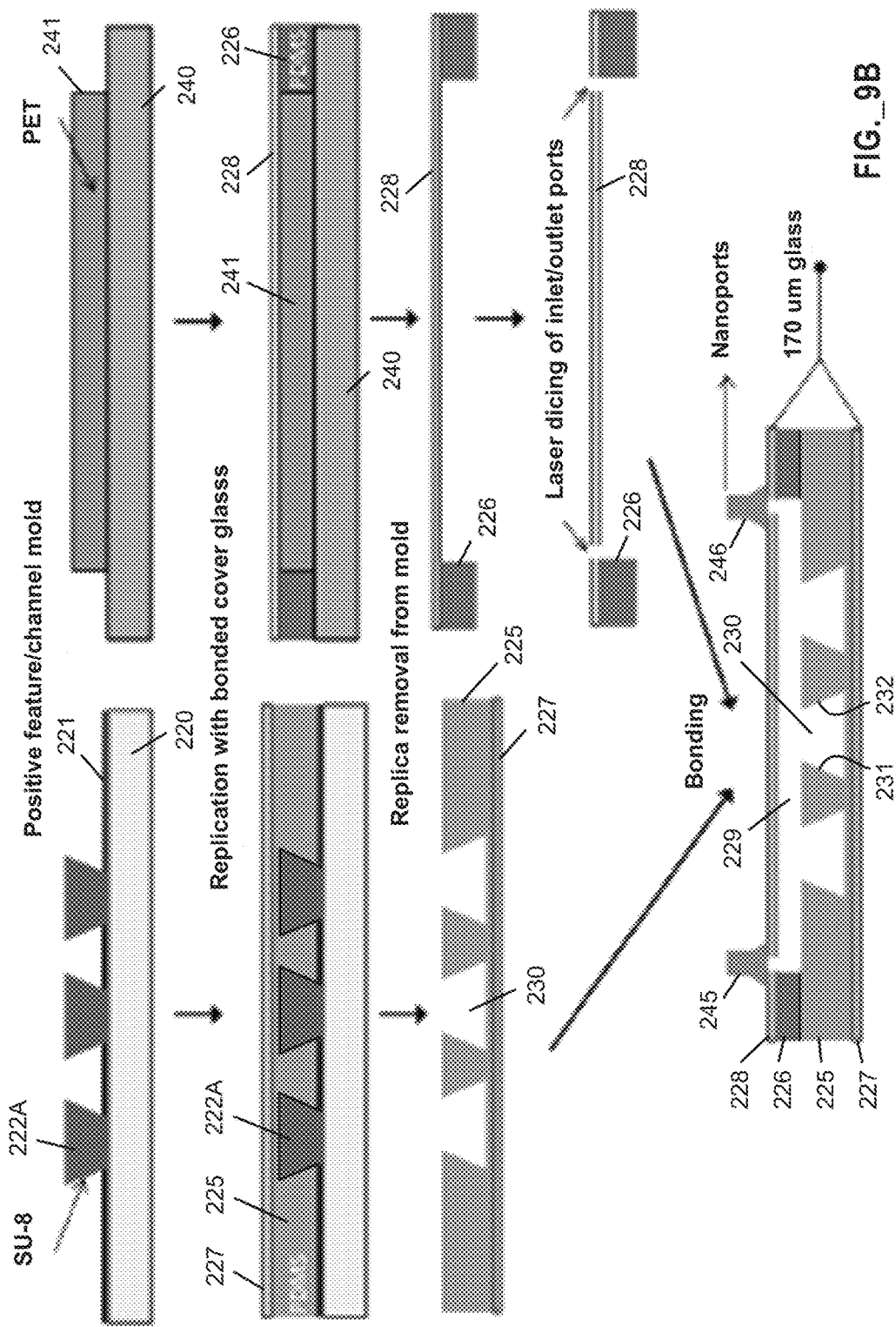
FIG. 9B illustrates steps of a method for producing a microfluidic device with at least one trapezoidal chamber suitable for generating a recirculating flow pattern utilizing backside diffuser photolithography (BDPL).

As shown in FIG. 9B, a first positive SU-8 mold including a glass layer 220, a patterned chrome mask 221, and raised trapezoidal mesas 222A may be used to create ultra-thin (<100 µm) trapezoid replications using PDMS layer 225 with a coverglass backing 227. A second positive mold for producing a microchannel includes a raised PET region 241 (formed by laser cutting) over a substrate 240, wherein the second mold may be used to create a channel-forming replication using PDMS layer 226 with a coverglass backing 228. Laser drilling was used to form ports in the coverglass backing 228. Following removal of the two replicated halves from the respective molds, the replicated halves were surface treated and bonded along surfaces of the PDMS layers 225, 226 to form a 3D microvortex chip including a flow channel 229 and multiple trapezoidal microchambers 230 bounded by walls 231, 232, with ports 245, 246 that enable fluid communication with the flow channel 229. Aggregate thickness of the microfluidic flow channel 229 and microfluidic trapezoidal chambers 230 defined in the PDMS layers 225, 226 (i.e., equal to the spacing between outer coverglass layers) was 170 μm.

A third method for producing a microfluidic device with at least one trapezoidal chamber suitable for generating a recirculating flow pattern utilizes multi-step backside tilted (or inclined) exposure photolithography. A schematic of backside inclined exposure, development, and PDMS casting steps is shown in FIG. 10A. The method uses patterned chrome 321 on quartz 322 as a self-contained mask. Negative photoresists 320, KMPR or SU-8 were spin-coated on the chrome/quartz layers 321, 322 and subjected to tilted exposure from the backside to generate undercut trapezoids 322A, which served as molds for casting a layer of PDMS 325. The incident angle is determined by angle of tilted exposure and the refractive indices of the surrounding media (air in this case), quartz 322, and photoresist 320. The process can be implemented by changing the media from air to water or glycol using backside tilted exposure in water (refractive index 1.33) bath or in glycol (refractive index 1.47) bath to get various incidental angles. An angle block may also be used to impinge the incident angle of the light at any suitable angle (e.g., 60°) with respect to normal to the surface of the wafer. Further details regarding one implementation of the foregoing process summary are provided below.

A standard lift-off process for chromium using AZ 3312 photoresist as a mask was used to pattern chrome on quartz as a self-contained mask. After the mask was imprinted on the wafer, a precision spin coater (Specialty Coating Systems Inc.) was used to spin a 50 μm thick, KMPR 1050 or SU-8 layer onto the wafer at 3000 rpm for 30 seconds. Thereafter, a soft bake was performed using a ramp rate of 1° C./min. Exposure doses from 60-90% of full exposure (to modulate feature profile and ensure good feature adhesion) i.e. 900-1350 mJ/cm$^2$ of 365 nm UV light were successfully employed; and following a post-exposure bake, the wafer was developed in SU-8 developer (1-Methoxy-2-propanol acetate, Microchem Corp) with agitation, for about 3-5 minutes. Finally, the wafer was hard baked at 160° C. to further crosslink KMPR and enhance the adhesion.

For high resolution imaging, the features needed to be replicated onto thin (~170 μm) cover glass. Conventional micromolding as well as a non-conventional PDMS-PDMS demolding technique (Shao et al., 2003) were used for this purpose. PDMS will adhere to most glass surfaces, unless they are pretreated with an anti-adhesion silane. The wafer with the features was first oxidized with air plasma for 45 seconds at 500 mTorr and 10 W. Tridecafluoro-1,1,2,2-tetrahydrooctyl trichlorosilane was vapor deposited onto the wafer surface in a desiccator by applying vacuum for a period of 45 minutes to 1 hour. Following this, a 10:1 ratio of PDMS-to-crosslinker was thoroughly mixed, poured into a dish and degassed until all the bubbles were removed. Thereafter, a 75 mm×50 mm piece of 170 μm thick microscope cover glass (Ted Pella Inc.) was oxidized and activated with air plasma (500 mTorr, 10 W, 50 seconds). A bare minimum amount of PDMS, enough to cover the surface area of the features, was then poured onto the wafer and the cover glass was placed over the PDMS so that it would bond to the PDMS while the PDMS was cured in an oven at 60° C. for about two hours.

A 50 μm thick KMPR channel mold was created on a 4" silicon wafer and a PDMS mold was obtained on another 170 μm thick cover glass, in a similar manner as with the trapezoidal feature portion described earlier. Two 350 μm diameter inlet and outlet ports were then cut out with a high-powered 355 nm laser using a PotoMAC laser ablation system. The two halves were then oxidized/activated using air plasma for 1 minute at 500 mTorr and 10 W (to form siloxy groups) and were bonded together, avoiding air gaps to assure flow without leaks. Immediately after contact, the device was annealed for 20 minutes at 60° C. Finally, nanoports (Upchurch Scientific) were attached as inlet and outlet for permanent sealing, or a detachable fluidic probe (CorSolutions) was used.

Figure 10B:
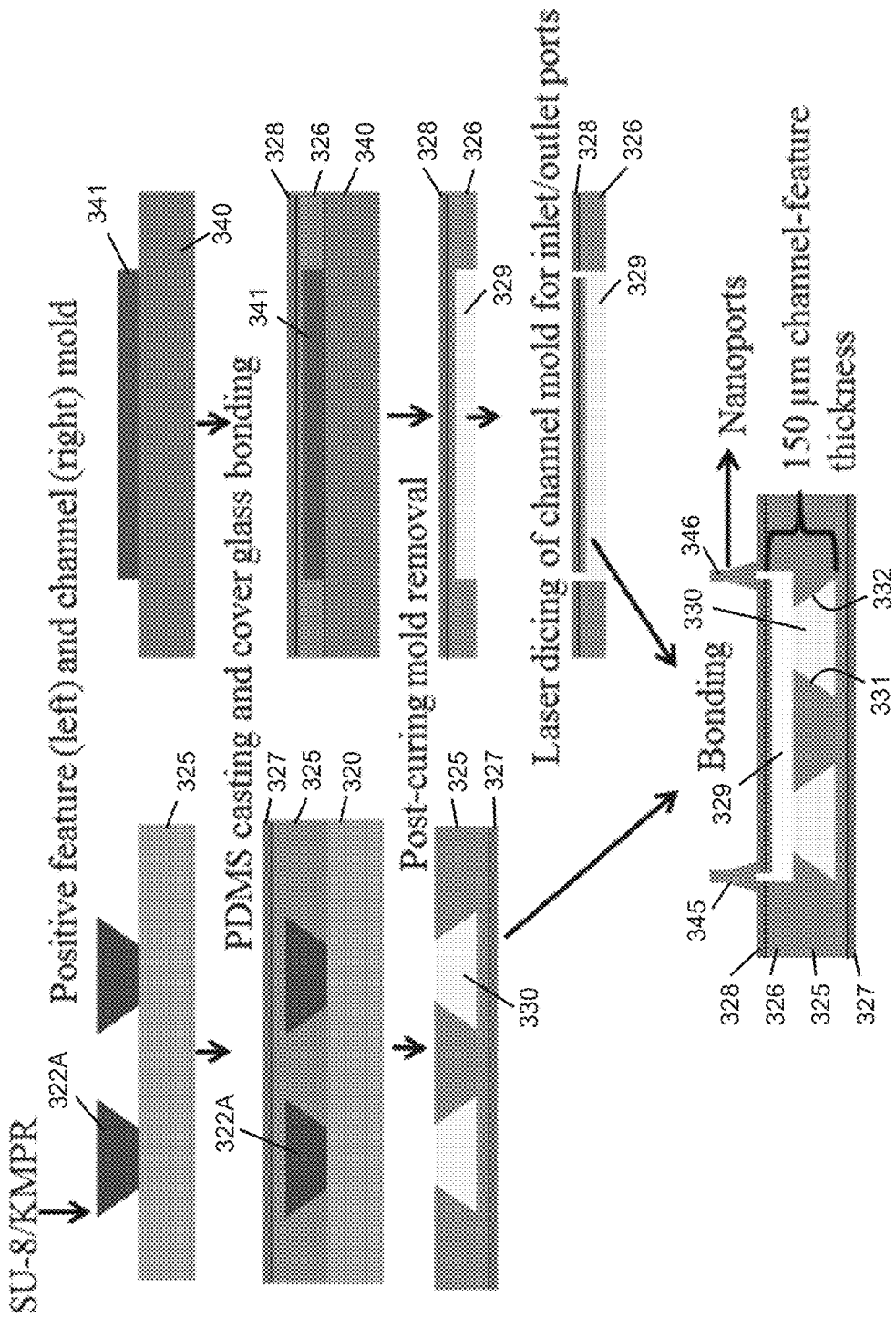
FIG. 10B illustrates steps of a method for producing a microfluidic device with at least one trapezoidal chamber suitable for generating a recirculating flow pattern, the method utilizing multi-step backside tilted (or inclined) exposure photolithography.

A schematic of the multi-layer assembly process to obtain the final chip is shown in FIG. 10B, including the steps of PDMS casting and cover glass bonding over molds for the positive (trapezoidal) features and flow channel, followed by post-curing mold removal, laser dicing (or drilling) of the channel mold to define inlet/outlet ports, bonding of the resulting subassemblies, and affixing of nanoports to permit fluid connection to the microfluidic device. A first positive mold included undercut trapezoids 322A arranged over a negative photoresist 320. The first mold was used to create ultra-thin trapezoid replications using PDMS layer 325 with a coverglass backing 327. A second positive mold included a raised PET region 341 arranged over a substrate 340. The second positive mold was used to create a channel-forming replication using PDMS layer 326 with a coverglass backing 328. Laser drilling was used to form ports in the coverglass backing 328. Following removal of the two replicated halves from the respective molds, the replicated halves were surface treated and bonded along surfaces of the PDMS layers 325, 326 to form a 3D microvortex chip including a flow channel 329 and multiple trapezoidal microchambers 330 bounded by walls 331, 332, with ports 345, 346 enabling fluid communication with the flow channel 329. Aggregate thickness of the microfluidic flow channel and microfluidic trapezoidal chambers was 150 μm.

A fourth method for producing a microfluidic device with at least one trapezoidal chamber suitable for generating a recirculating flow pattern involves fabrication of a microvortex chamber using plastics with superior optical properties, such as ZEONEX®/ZEONOR® cyclo olefin polymer (COP) from Zeonex or cyclic olefin copolymers (COC) from TOPAS. The under-cut trapezoids are replicated from a soft stamp, such as PDMS stamp, to COC or COP film of 170 um thickness. The soft stamp can be fabricated using the aforementioned first through third methods. The replication process could be performed using hot-embossing or rolling roller. The two halves of the 170 um thick COC or COP film may be bonded using either thermal fusion bonding or solvent assisted bonding methods. After formation of the sealed micro-vortex chamber, the COC or COP film may be sandwiched between a plastic manifold with an opening at the center for optical trapping and imaging.

Flow Actuation

To accurately measure flow rates required for cell rotation, an integrated assembly of a nanoliter/min precision pump and flow sensor (Dolomite Microfluidics) were acquired and connected upstream from a microfluidic chip as described herein. The sensor has a flow rate accuracy of 10%, a response time of 30 ms, can handle a maximum pressure of 5-100 bar (approximately 72-1440 psi), has a maximum pressure drop of 5 mbar across it, and most importantly, it has an inner diameter of 150 μm. This ensured that if the liquid was adequately filtered, there would be no clogs in the sensor, ensuring uninterrupted flow to the microfluidic chip. The pump provided pulseless liquid flow with a precise pressure driven pumping mechanism and operated over a pressure range of 0-10 bar (0-144 psi, approximately). The pump through integration of the flow sensor can provide precise flow control in addition to pressure control, which makes experiments easy to set-up and optimize. FIG. 11 illustrates flow rate calibration for DPBS buffer in comparison to water for the sensor, expressed as measured flow rate versus input flow rate.

Figure 12B:
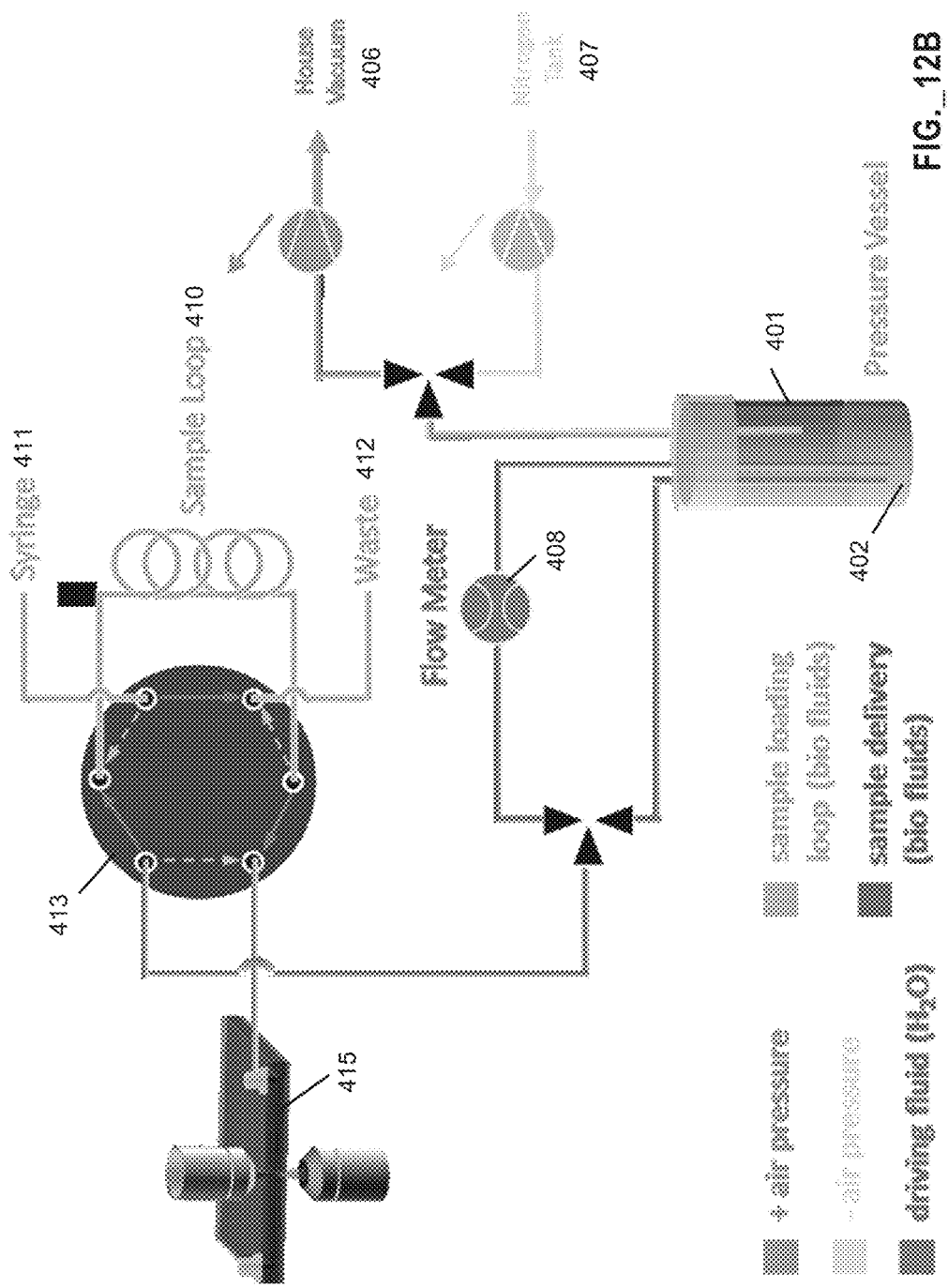
FIG. 12B is a schematic including components and fluid paths for a custom pump of a microfluidic pump-sensor assembly.

A novel air pressure regulated pump (with an integrated Sensirion sensor) was designed and characterized. The pump has nanoliter per minute flow rate regulation, has <1% flow variability, and allows for bidirectional flow manipulation at flow rates ranging from 100-1500 nL/min. The time average variation in the flow was 2.6% over two minutes, and exhibited an average response time of 363 ms. The ability to produce constant low particle velocities, and the ability to bring the particle to zero velocity in less than a second, were demonstrated. FIG. 12A provides a simplified schematic of the microfluidic pump-sensor assembly 400. The pump-sensor assembly 400 includes a liquid reservoir 402 contained in a gas pressure chamber 401 arranged to maintain pressure at a constant value, a pressure sensor 403 arranged to monitor pressure of the gas pressure chamber 401, and a control mechanism 404 arranged to control pressure of gas supplied to the pressure chamber 401, wherein liquid from the reservoir 402 may be supplied to a microfluidic circuit (not shown). A more detailed schematic including components and fluid paths for the custom pump is provided in FIG. 12B. The gas pressure chamber 401 is in fluid communication with a vacuum source 406 and a nitrogen source 407 that enable pressure therein to be controlled. Liquid from a reservoir 402 within the gas pressure chamber 401 may be supplied through a flow meter 408 to a sample loading valve 413, which includes connections for a sample loading syringe 411, a sample loop 410, and waste 412. The loading valve 413 is arranged to permit a sample to be supplied to a microfluidic device 415.

Optical Trapping and Imaging

Figure 14A:
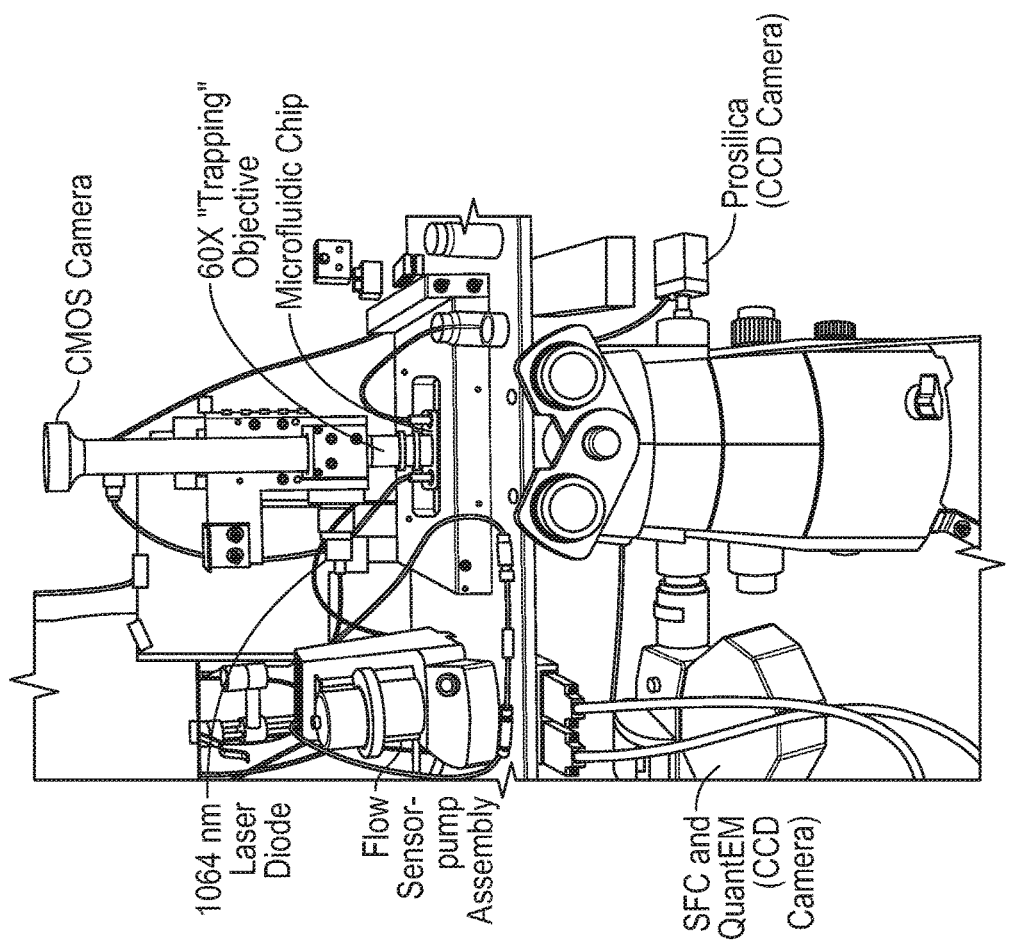

To accomplish micromanipulation of cells and beads, and especially for stabilizing cell rotation in a microvortex, an optical tweezers setup was used. The dynamic optical tweezers also enable trapping and transporting of individual cells. A 1064 nm, 600 mW diode laser (LD-1064-BF-600, Innolume GmbH) was coupled through a single mode fiber to a beam expander. This produced a 12 mm collimated beam to roughly match the objective back aperture. The beam was then reflected off an 825 nm short pass dichroic mirror (Omega Optical Inc., Brattleboro, Vt.) and focused through an apochromatic 60× (NA=1.49) oil immersion, TIRF objective lens. The objective focused the laser beam to form a strong optical trap, provided the beam had an almost Gaussian profile and was accurately aligned so as to not be clipped by the objective. White light from an LED source was focused through a plan-apochromatic 60× (NA=1.2) water immersion objective, mounted on an inverted Nikon TI-S microscope. A joystick was used for moving in the xy-plane. Z-axis control was established using a spring-loaded mechanism allowing for micrometer range precision control. A CCD camera, the Prosilica GE 1650 (Gigabit Ethernet type, Allied Vision Technologies, Newburyport, Mass.) was mounted on the right bottom port of the microscope and used for bright-field imaging. The bottom left port was coupled to a swept field confocal (SFC) scanner unit conjugated to a sensitive CCD camera, the QuantEM (with electron-multiplying gain, Photometrics, Tucson, Az.). This camera was used for fluorescently labeled live or fixed cell imaging. The SFC unit (Prairie Technologies, Middleton, Wis.) was driven by a combination galvanometer and piezoelectric crystal scanning setup for z-axis optical sectioning. This system allowed high quality confocal fluorescence imaging to be accomplished. It provided 100 fps in pinhole imaging mode and 1000 fps in slit mode. The piezo could execute high-speed z-stack acquisitions with a travel range of −150 μm and 0.1 μm step size. The Prairie View software enabled collection of z-series and t-series images, for cell reconstruction and rotation characterization, respectively. A schematic of the physical system setup is shown in FIG. 13, including an IR laser source 501, a camera 502, an objective for optical trapping 503, a pump sample delivery valve 504, a white light LED 505, a Prosilica GE 1650 CCD camera 506, a dichroic mirror 509, a swept field confocal scanner unit 507, and a microvortex chip 510. A first illustration showing the optical trapping and imaging setup is shown in FIG. 14A, and a magnified portion is shown in FIG. 14B.

A schematic of a modified physical system setup is shown in FIG. 15, including an IR laser source 601, a camera 602, a pump sample delivery valve 604, a multicolor LED light source 605A, a xenon white light source 605B, a dichroic mirror 609, a swept field confocal scanner unit 607, and a microvortex chip 610. An illustration showing the modified physical system setup is shown in FIG. 16. A schematic showing an IR optical tweezer 620 including a high NA objective lens 615, immersion oil 616, and a microfluidic trapezoidal chamber 630 (containing a cell 621) underlying a flow channel 629 of a microvortex device as disclosed herein is provided in FIG. 17. A schematic showing rotation of a cell about an axis perpendicular to an optical interrogation direction (e.g., 3D rotation, to permit 3D imaging) is illustrated in FIG. 18.

Micro Fabrication Images

Figure 19:
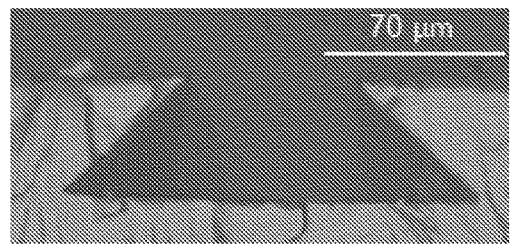
FIG. 19 is a photographic cross-sectional view of a PDMS feature including a trapezoidal channel.

A cross-sectional view of a PDMS feature including a trapezoidal channel is shown in FIG. 19.

Figure 20:
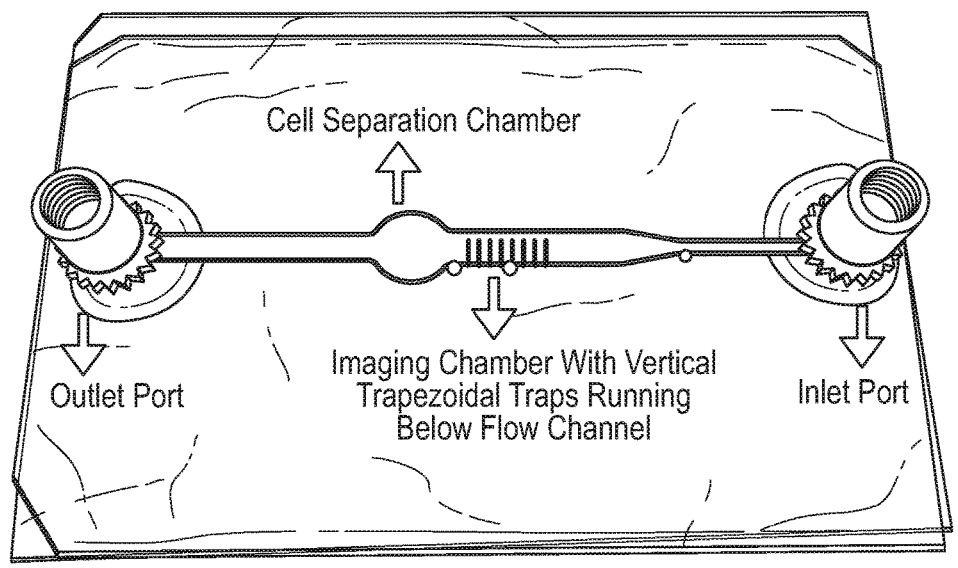
FIG. 20 is an illustration of a microfluidic device including an inlet port, an outlet port, a cell separation chamber, and an imaging chamber including multiple trapezoidal traps running below the flow channel.

An illustration of a microfluidic device including an inlet port, and outlet port, a cell separation chamber, and an imaging chamber including multiple trapezoidal traps running below the flow channel is shown in FIG. 20. Such device was produced using a stacked multi-layer technique described herein.

The backside tilted exposure lithography technique yielded trapezoidal features after PDMS casting as shown in the cross-sectional images in FIGS. 21A and 21B, with air and water as the respective media of exposure. As can be seen, the features have a flat-backed surface which facilitates high-resolution imaging when conjugated with 170 μm thick microscopic cover glass. This method has significant advantages over its counterpart, the backside diffuser photolithography (BDPL) method. BDPL uses a 180 degree diffuser to scatter collimated light over the exposed area. Therefore, both the sidewalls of the features and the ends have a rounded appearance, which introduces un-swept (dead) volume at both ends. The PDMS-PDMS demolding technique allows reliable and repeatable replica formation and high yield chip fabrication. It improved the yield to 100% from 30-40% using traditional molding; by allowing one flexible mold half instead of two rigid and delicate cover glass halves to be demolded during the individual demolding steps for each half. A fully assembled chip is shown in FIG. 22. From top to bottom, the chip has a 3 mm wide channel half with a side channel (horseshoe) which acts as a delivery mechanism for cells, and an array of 50 μm deep trapezoidal chambers of varying inlet widths (50-100 μm), with a side channel (horseshoe) which acts as a delivery mechanism for cells. Using this mechanism, one can potentially pick a cell of interest using the optical tweezers, and displace it along the side channel length until it is in the main channel and can be rotated in one of the trapezoidal chambers.

FIGS. 26-33 are photographs of microstructures fabricated according to the methods disclosed herein.

Cell Rotation Experiments and Data

In one set of experiments utilizing a microfluidic device produced by backside diffuser photolithography as disclosed herein, cells were flown in using nanoports at the inlet and outlet of the chip channel. The flow was then stopped and a cell of interest was trapped and lowered into the microvortex using a 1064 nm laser. For live cell rotation studies, an immortalized dysplastic human esophageal epithelial cell line (CP-A) cultured at 37° C. and 5% CO2 atmosphere in Keratinocyte SFM cell growth medium (Invitrogen, Carlsbad, Calif.) were trypsinized and then loaded into a syringe. Cells were then flowed into the microchannel by applying pressure to the input syringe. When a cell of interest approached a microfeature, flow was ceased and the cell trapped using optical tweezers. The cell was then brought into the microfeature and positioned so that its center coincided with the center of the microvortex. Pressure was then applied to the input syringe to create flow in the microchannel, initiating a microvortex, inducing cell rotation.

In another set of experiments, a setup previously described herein was used to deliver, pick, and rotate live single K-562 cells (myelogenous leukemia cell lines) in RPMI cell culture medium by introducing them either through an inlet valve upstream from the chip, or through a cell delivery chamber built into the chip (horseshoe design). The live cells were rotated about an axis perpendicular to the imaging axis. A calibration study was performed to ascertain that the pump-sensor assembly could be used with Dulbecco's Phosphate-Buffered Saline (DPBS, Sigma Aldrich) instead of DI water which it was calibrated to work with. The responses for both fluids were almost linear and the flow rates of DPBS were only found to be 0.0085% different from those of DI water, i.e. it could be safely assumed that the flow rates with water as the calibrated fluid could be used for DPBS as well, without having to compensate for the change in density or other properties of DPBS. To obtain high resolution reconstruction of imaged cells, cells need to be rotated as slowly and stably as possible. To gauge this, cells first rotated in trapezoidal chambers of various inlet widths and determined the slowest flow rates (µL/min) required in the main channel to induce cell rotation, and rates required to maintain stable and continuous rotation. For these experiments, a flow sensor capable of reading in the 1-50 µL/min range was used. The results can be seen in the table in FIG. 23A. In such figure, slowest flow rate=minimum rate required to initiate rotation; stable flow rate=flow rate at which rotation becomes regular/continuous. While determining the fastest flow rate (not shown in Fi, readings were saturated at 50 µL/min for all widths since that was the sensor's upper limit (0.5, 0.6, 0.5 and 0.75 revolutions/s being the rotation rates for the respective trapezoidal features).

At least three cells (of different diameters) were rotated in each trapezoidal chamber to obtain these values of flow rates. Rotation datasets were obtained from both bright-field and fluorescence imaging modes on the microscope, as can be seen in the time series snapshots in FIG. 23B and FIG. 23C. In FIG. 23B, a cell is rotating at a flow rate of 50 µL/min and rotation rate of approximately 0.5 revolutions/s. In FIG. 23C, a cell stained with Hoechst 33342, is rotating at a rate of 0.5 revolutions/s at a flow rate of 50 µL/min.

Figure 25:
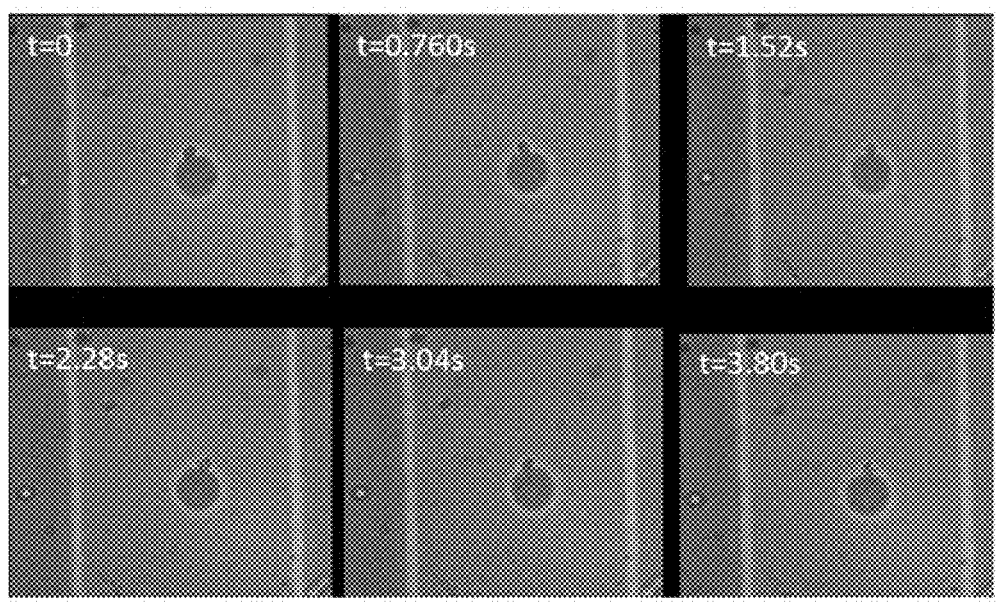
FIG. 25 embodies photographs demonstrating a 15-μm bead being rotated in a microvortex.

Results of additional experimentation are shown in FIGS. 24A-24C. FIG. 25 includes photographs demonstrating a 15-µm bead being rotated in a microvortex.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Those skilled in the art will recognize improvements and modifications to the preferred embodiments of the present disclosure. All such improvements and modifications are considered within the scope of the concepts disclosed herein and the claims that follow.

What is claimed is:

1. A device for 3D hydrodynamic microvortical rotation of at least one live single cell or cell cluster, the device comprising:
   a fluidic apparatus including a microfluidic flow channel and at least one microfluidic chamber arranged below the microfluidic flow channel, wherein:
      the at least one microfluidic chamber comprises an inlet opening arranged along a lower boundary of the microfluidic flow channel, wherein the inlet opening permits fluid communication between the at least one microfluidic chamber and the microfluidic flow channel; and
      the at least one microfluidic chamber comprises a trapezoidal cross-sectional shape transverse to a primary direction of flow in the microfluidic flow channel;
   a laser source configured to transmit laser emissions through a first objective lens arranged proximate to a first surface of the fluidic apparatus to impinge on contents within an interior of the at least one microfluidic chamber;
   a first camera configured to image at least a portion of the contents within the interior of the at least one microfluidic chamber through the first objective lens;
   a visible light source configured to transmit light emissions through a second objective lens arranged proximate to a second surface of the fluidic apparatus to impinge on the contents within the interior of the at least one microfluidic chamber, wherein the second surface generally opposes the first surface;
   a second camera configured to image at least a portion of the contents within the interior of the at least one microfluidic chamber through the second objective lens; and
   a third camera configured to image at least a portion of the contents within the interior of the at least one microfluidic chamber through the second objective lens.

2. The device of claim 1, wherein:
   the inlet opening comprises an inlet width;
   the at least one microfluidic chamber further comprises a bottom wall comprising a bottom width that exceeds the inlet width, a front wall extending between and arranged at an acute angle relative to the inlet opening and the bottom wall, and a rear wall extending between and arranged at an acute angle relative to the inlet opening and the bottom wall; and the trapezoidal cross-sectional shape is defined by the bottom wall, the inlet opening, the front wall, and the rear wall.

3. The device of claim 1, wherein the at least one microfluidic chamber comprises a height to width ratio in a range of from about 0.5 to about 2.

4. The device of claim 1, wherein the at least one microfluidic chamber comprises a plurality of microfluidic chambers sequentially arranged along the microfluidic flow channel.

5. The device of claim 1, further comprising an inlet port and an outlet port arranged to permit a flow of pressurized fluid to be directed through the microfluidic flow channel.

6. The device of claim 1, wherein said device is configured for 3D rotation of the at least one live single cell or cell cluster within the at least one microfluidic chamber around an axis perpendicular to an optical or visual axis by which the at least one live single cell or cell cluster is imaged.

7. The device of claim 6, wherein the laser source and the first objective lens, optionally in combination with the second objective lens, form portions of an optical tweezer apparatus or optical trap arranged to perform at least one of the following functions:
(a) facilitate introduction of the at least one live single cell or cell cluster into the at least one microfluidic chamber,
(b) stabilize rotation of the at least one live single cell or cell cluster in a microvortex in the at least one microfluidic chamber,
(c) trap the at least one live single cell or cell cluster at a desired location within the fluidic apparatus; and
(d) transport at least one live single cell or cell cluster to a desired location within the fluidic apparatus.

8. The device of claim 1, wherein:
the second camera is configured to perform bright-field imaging; and
the third camera is configured for imaging of fluorescently labeled live or fixed cells.

9. The device of claim 8, wherein the third camera is associated with a swept field confocal scanner unit.

10. The device of claim 9, wherein the swept field confocal scanner unit is configured to be driven by a combination galvanometer and piezoelectric crystal scanning setup, and is configured to perform z-axis optical sectioning of contents within the interior of the at least one microfluidic chamber.

11. The device of claim 9, wherein the third camera provides electron-multiplying gain functionality.

12. The device of claim 8, further comprising:
a first dichroic mirror optically coupled (i) between the laser source and the first objective lens and (ii) between the first camera and the first objective lens;
a second dichroic mirror optically coupled between the visible light source and the second objective lens;
a third dichroic mirror optically coupled between the second camera and the second objective lens; and
a fourth dichroic mirror optically coupled between the third camera and the second objective lens.

13. The device of claim 12, wherein the laser source comprises an infrared laser configured to emit laser emissions predominantly in an infrared range, and a beam expander is provided between the laser source and the first dichroic mirror.

14. The device of claim 12, wherein:
the first objective lens is optically coupled with the first surface, and/or the second objective lens is optically coupled with the second surface, via at least one immersion fluid.

15. The device of claim 1, wherein the first surface comprises a top surface of the fluidic apparatus, and the second surface comprises a bottom surface of the fluidic apparatus.

16. A method of using the device of claim 1, the method comprising supplying the at least one live single cell or cell cluster to the at least one microfluidic chamber, and flowing fluid through the microfluidic flow channel to establish a microvortex in the at least one microfluidic chamber and thereby rotate the at least one live single cell or cell cluster, wherein said at least one live single cell or cell cluster is rotated within the at least one microfluidic chamber around an axis perpendicular to an optical or visual axis by which the at least one live single cell or cell cluster is imaged.

17. A live-cell computed tomography or live-cell microscopy apparatus comprising the device of claim 1.

* * * * *